US010207934B2

(12) United States Patent
zur Loye et al.

(10) Patent No.: US 10,207,934 B2
(45) Date of Patent: Feb. 19, 2019

(54) SYNTHESIS AND CRYSTAL STRUCTURE OF IRON ZEOLITIC FRAMEWORKS

(71) Applicant: UNIVERSITY OF SOUTH CAROLINA, Columbia, SC (US)

(72) Inventors: Hans-Conrad zur Loye, Columbia, SC (US); William Michael Chance, Columbia, SC (US)

(73) Assignee: University of South Carolina, Columbia, SC (US)

(*) Notice: Subject to any disclaimer, the term of this patent is extended or adjusted under 35 U.S.C. 154(b) by 245 days.

(21) Appl. No.: 15/218,742

(22) Filed: Jul. 25, 2016

(65) Prior Publication Data
US 2017/0022067 A1 Jan. 26, 2017

Related U.S. Application Data

(60) Provisional application No. 62/195,819, filed on Jul. 23, 2015.

(51) Int. Cl.
C01B 37/00 (2006.01)
C01B 39/00 (2006.01)
C01B 39/50 (2006.01)
C01B 39/08 (2006.01)
C01B 39/06 (2006.01)
C01B 39/46 (2006.01)

(52) U.S. Cl.
CPC .............. C01B 39/50 (2013.01); C01B 37/00 (2013.01); C01B 39/00 (2013.01); C01B 39/06 (2013.01); C01B 39/087 (2013.01); C01B 39/46 (2013.01)

(58) Field of Classification Search
CPC ....... C01B 39/06; C01B 39/087; C01B 39/50; C01B 39/46; C01B 37/00; C01B 39/00
See application file for complete search history.

(56) References Cited

U.S. PATENT DOCUMENTS 5,925,329 A * 7/1999 Williams ............... C01B 39/06
423/700
6,719,955 B1 * 4/2004 Hwu ..................... B01J 29/84
423/306

FOREIGN PATENT DOCUMENTS

EP 0158349 B1 * 3/1990 ............. B01J 29/84

OTHER PUBLICATIONS

Mokhonoana et al, "Highly loaded Fe-MCM-42 Materials:Synthesis and Reducibility Studies", Materials pp. 2337-2359, (2009) (Year: 2009).*

Szostak et al, "Prepartion of Ferrisilcate ZSM-5 Molecular Sieves" Journal of Catalysis, pp. 555-557 (1986) (Year: 1986).*
Szostak et al, "Crystallization of Ferrisilicate Molecular Sieves with a Sodalite Structure", J. Chem. Soc., Chem. Commun. (1986) (Year: 1986).*
Betteridge et al, "Preparation, characterisation and activity of an iron/sodalite catalyst for the oxidation of methane to methanol", Topics in Catalysis pp. 103-110 (1994) (Year: 1994).*
Aczel et al., "Frustration by Competing Interactions in the Highly-Distorted Double Perovskites $La_2NaB'O_6$ (B' = Ru, Os)", Physical Review, B-87, 2013, 7 pages.
Aczel et al., "Coupled Nd and B'Spin Ordering in the Double Perovskites $Nd_2NaB'O_6$ (B' = Ru, Os)", Physical Review, B-88, 2013, 6 pages.
Ali et al., "The $AFeO_2$ (A = K, Rb and Cs) Family: A Comparative Study of Structures and Structural Phase Transitions", Journal of Solid State Chemistry, 183-3, 2010, pp. 752-759.
Betteridge et al., "Preparation, Characterization and Activity of an Iron/Sodalite Catalyst for the Oxidation of Methane to Methanol", 1, Topics in Catalysis, 1994 (Abstract only).
Bugaris et al., "Investigation of the High-Temperature Redox Chemistry of $Sr_2Fe1.5Mo0.5O_{6-d}$ Via in situ Neutron Diffraction", Journal of Materials Chemistry A, 2, 2014, pp. 4045-4054.
Bugaris et al. "Crystal Growth, Structures, and Optical Properties of the Cubic Double Perovskites $Ba_2MgWO_6$", Journal of Solid State Chemistry, 184, 2011, pp. 2293-2298.
Bugaris et al., "Materials Discovery by Flux Crystal Growth: Quaternary and Higher Order Oxides", Angewandte Chemie International Edition in English, 51-16, 2012, pp. 3780-3811.
Chance et al., "Crystal Growth of New Hexahydroxometallates Using a Hydroflux", Inorganic Chemistry, 52-20, 2013, pp. 11723-11733.
Chance et al., "Synthesis and Crystal Structure of Dibarium Tungstate Hydrate, $Ba_2WO_5 \cdot H_2O$", Journal of Chemical Crystallography, 44-1, 2013, pp. 20-24.
Delattre et al., "Study of the Structural, Electronic, and Magnetic Properties of the Barium-Rich Iron(IV) Oxides, $Ba_2FeO_4$ and $Ba_3FeO_5$," Inorganic Chemistry, 41, 2002, pp. 2834-2838.
Delattre et al., "Synthesis and Structure of $BaKFeO_3$: A New Quaternary Oxide with 1-D Ferrate Chains", Journal of Solid State Chemistry,172, 2003 pp. 261-264.2.
Hübschle et al., "ShelXle: A Qt Graphical User Interface for SHELXL", Journal of Applied Crystallography, 44, 2011, pp. 1281-1284.
SHELXTL Version 6.14, Bruker Analytical X-Ray Systems, Inc, Madison, Wisconsin, 2000.
SMART Version 5.631, Saint+ Version 6.45 and SADABS Version 2.10, Bruker Analytical X-Ray Systems, Inc, Madison, Wisconsin, 2003.
Zhao et al., $Ba_4KFe_3O_9$: A Novel Ferrite Containing Discrete 6-Membered Rings of Corner-Sharing $FeO_4$ Tetrahedra, Inorganic Chemistry, 50-20, 2011, pp. 10310-10318.

* cited by examiner (Continued)

Primary Examiner — David M Brunsman
(74) Attorney, Agent, or Firm — Dority & Manning, P.A.

(57) ABSTRACT

Iron-based crystal structures including $FeO_4$ tetrahedrally coordinated in three dimensions in a framework analogous to a zeolite. The structures having the general formula $A_yB_8Fe_{12}O_{24}(O/OH)_6 \cdot xH_2O$ in which A is Na, K, Cs, Rb or a combination thereof and B is an alkaline earth element or a combination of alkaline earth elements.

20 Claims, 20 Drawing Sheets

SYNTHESIS AND CRYSTAL STRUCTURE OF IRON ZEOLITIC FRAMEWORKS

CROSS REFERENCE TO RELATED APPLICATION

This application claims filing benefit of U.S. Provisional Patent Application Ser. No. 62/195,819 entitled "Synthesis, Crystal Structure, and Preliminary Magnetic Studies of First Iron Zeolites," having a filing date of Jul. 23, 2015, which is incorporated herein by reference thereto in its entirety.

GOVERNMENT SUPPORT STATEMENT

This invention was made with government support under DE-SC0001061 awarded by the Department of Energy and under DMR-1301757 awarded by the National Science Foundation. The government has certain rights in the invention.

BACKGROUND

Materials discovery through crystal growth continues to be the best way to explore phase space in the quest for new or improved physical properties. Soft chemical methods allow for the investigation of regions of phase-space inaccessible via traditional synthetic routes.

Iron (III) is known to take on a tetrahedral coordination environment with oxygen in some of its compounds, though it predominately prefers an octahedral environment. Most often, these tetrahedra are isolated. However, some compounds have shown that $FeO_4$ tetrahedra can be condensed into higher dimensional structures. A small number of compounds have shown $FeO_4$ tetrahedra corner-shared to form various-membered rings such as $AFeO_2$ (A=K, Rb and Cs), $Ba_4KFe_3O_9$, $Na_{14}Fe_6O_{16}$, and $Ba_3Fe_2O_6$. This is not unlike what is observed in silicate chemistry, despite the obvious disparity between the two elements' propensity to form condensed frameworks.

SUMMARY

According to one embodiment, disclosed is an iron-based crystal structure having the formula:

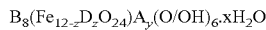

$$B_8(Fe_{12-z}D_zO_{24})A_y(O/OH)_6 \cdot xH_2O$$

In which:
A is Na, K, Cs, or a combination thereof;
$1 \leq y \leq 6$;
B comprises Be, Mg, Ca, Sr, Ba, or a combination thereof;
$0 \leq x \leq 25$;
D is an element that can take on tetrahedral coordination; and
$0 \leq z \leq$ about 6.

According to another embodiment, disclosed is an iron-based crystal structure having the formula $A_yB_8Fe_{12}O_{24}(O/OH)_6 \cdot xH_2O$. In one particular embodiment, the iron-based crystal structure can have the formula $B_8(Fe_{12}O_{24})A_y(O/OH)_6 \cdot xH_2O$, for instance $Ba_8(Fe_{12}O_{24})Na_y(O/OH)_6 \cdot xH_2O$, or $Na_{2.84}Ba_8Fe_{12}O_{24}(O/OH)_6 \cdot 6.3H_2O$ in one embodiment.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1A:
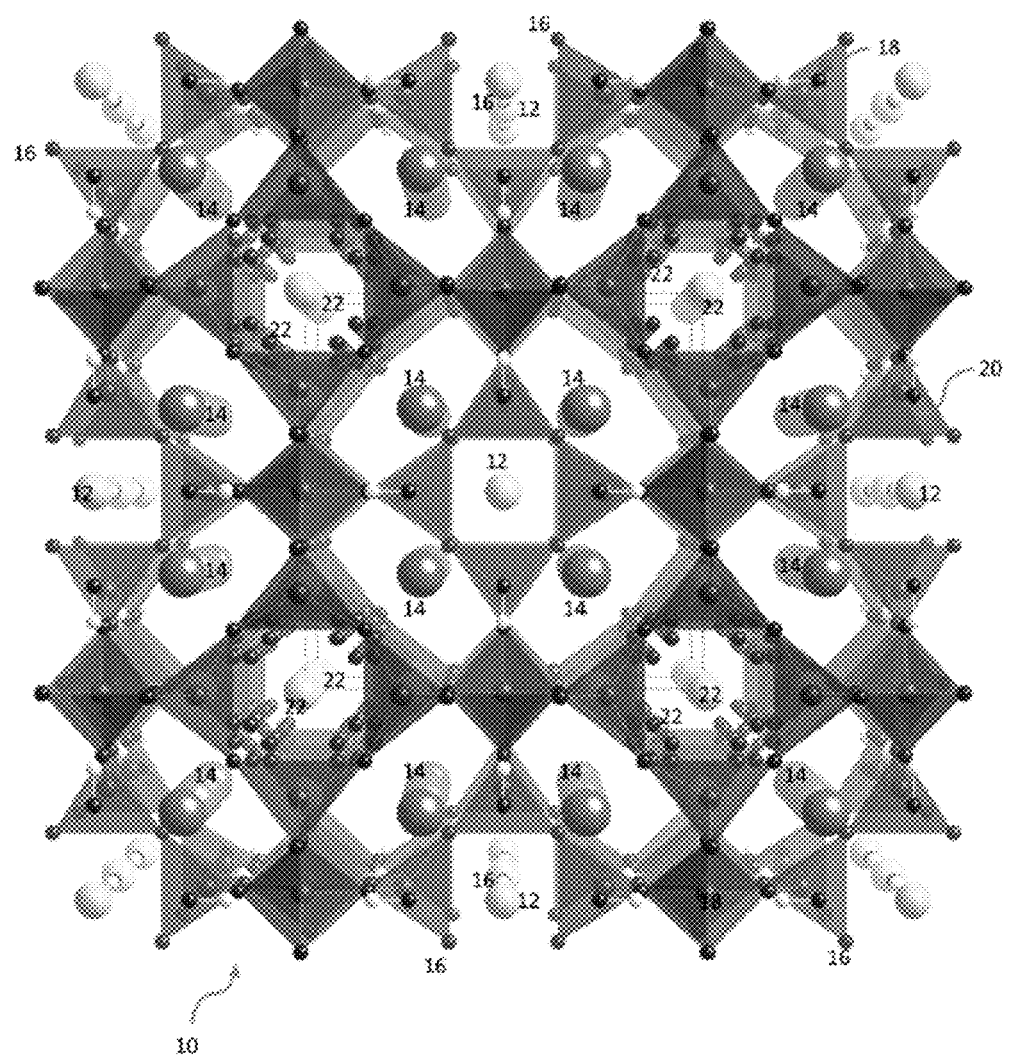
FIG. 1a shows a crystal structure of $B_8(Fe_{12}O_{24})A_y(O/OH)_6 \cdot xH_2O$, where A is Na, K, Cs, or a combination thereof and B is an alkaline earth element or a combination of alkaline earth elements. Hydrogen atoms are not shown and disorder in some of the oxygen atoms of the $Fe_{12}O_{24}$ framework are omitted for clarity, namely the O1a oxygens in Table 2 are not shown.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the term "alkaline earth metal" (i.e., "AEM") refers to beryllium (Be), magnesium (Mg), calcium (Ca), strontium (Sr), barium (Ba), radium (Ra), or a combination thereof. Alkaline earth metals readily lose their two outermost electrons to form cations with charge 2+ and an oxidation state, or oxidation number of +2. In the modern IUPAC nomenclature, the alkaline earth metals comprise the group 2 elements.

As used herein, the term "alkali metal" (i.e., "AM") refers to the chemical elements lithium (Li), sodium (Na), potassium (K), rubidium (Rb), cesium (Cs), or a combination thereof. Alkali metals readily lose their outermost electron to form cations with charge 1+ and an oxidation state, or oxidation number of +1. In the modern IUPAC nomenclature, the alkali metals comprise the group 1 elements.

It is to be understood that the use of "comprising" in conjunction with the embodiments described herein specifically discloses and includes the embodiments that "consist essentially of" the named components (i.e., contain the named components and no other components that significantly adversely affect the basic and novel features disclosed) and the embodiments that "consist of" the named components (i.e., contain only the named components except for contaminants which are naturally and inevitably present in each of the named components).

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Zeolites are a vast, industrially relevant class of compounds that are traditionally comprised of an aluminosilicate framework that has open space or cavities that allow for water, ions, or gases to exchange or adsorb. The series of compounds presented herein represent iron oxides that exhibit a three dimensional framework analogous to that seen in sodalite (See, FIG. 1a and FIG. 1b). That is, the iron-based crystal structure is believed to be the first compound with FeO$_4$ tetrahedrally coordinated in three dimensions in a framework analogous to a zeolite. Given the catalytic activity of the doped alum inosilicate variant, these new compounds are an exciting discovery that opens the door to a broad array of future experiments. The synthesis, crystal structure, and a preliminary magnetic properties investigation are presented herein.

The iron-based zeolite crystal structure presented herein generally has the formula:

A$_y$B$_8$Fe$_{12}$O$_{24}$(O/OH)$_6$·xH$_2$O     (Formula 1)

where A is Na, K, Cs, Rb or a combination thereof; 1≤y≤6 (e.g., 1≤y≤3, 1≤y≤2.5, or 1≤y≤2); B is an alkaline earth element or a combination of alkaline earth elements (i.e., B comprises Be, Mg, Ca, Sr, Ba, or a combination thereof); and 0≤x≤about 25 (e.g., 0≤x≤25, such as 1≤x≤10).

Formula 1 is the Fe$_{12}$O$_{24}$ analogy to the sodalite structure with Ba, Na and O or OH atoms in the channels providing charge balance. There are also water molecules in the channels, which based on TGA can be removed by heating the zeolite. Thus, a more accurate representation of the iron-based zeolite crystal structure is in Formula 2:

B$_8$(Fe$_{12}$O$_{24}$)A$_y$(O/OH)$_6$·xH$_2$O     (Formula 2)

where A is Na, K, Cs, Rb, or a combination thereof; 1≤y≤6 (e.g., 1≤y≤3, 1≤y≤2.5, or 1≤y≤2); B is an alkaline earth element or a combination of alkaline earth elements (i.e., B comprises Be, Mg, Ca, Sr, Ba, or a combination thereof); and 0≤x≤about 25 (e.g., 0≤x≤25, such as 1≤x≤10, and in one particular embodiment x is about 1.75).

In certain embodiments, dopants and/or other substitutions can be made at the iron site, as shown in Formula 3:

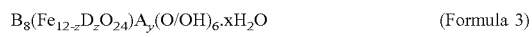

B$_8$(Fe$_{12-z}$D$_z$O$_{24}$)A$_y$(O/OH)$_6$·xH$_2$O     (Formula 3)

where A is Na, K, Cs, Rb, or a combination thereof; 1≤y≤6 (e.g., 1≤y≤3, 1≤y≤2.5, or 1≤y≤2); B is an alkaline earth element or a combination of alkaline earth elements (i.e., B comprises Be, Mg, Ca, Sr, Ba, or a combination thereof); 0≤x≤about 25 (e.g., 0≤x≤25, such as 1≤x≤10, and in one particular embodiment x is about 1.75); D is an element that can take on tetrahedral coordination, such as a main group element (e.g., Si, Ge, Al, Ga, P, As, Zn, or a combination thereof) or a transition metal element (e.g., V, Cr, Mn, Co, Ni, Cu, or a combination thereof) or a combination thereof; 0≤z≤about 6, such as 0≤z≤about 2, and in one particular embodiment about 0.5.

Figure 1B:
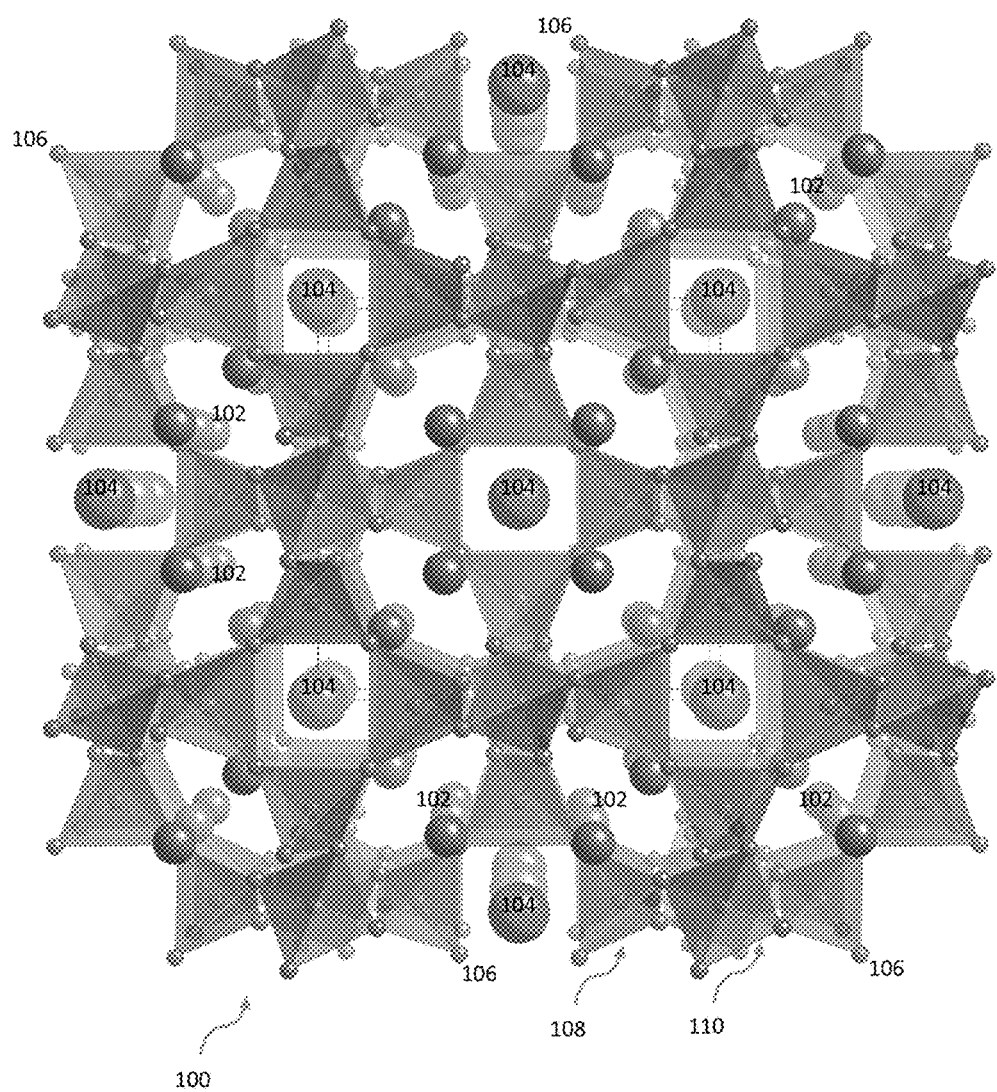
FIG. 1b shows, for comparison to FIG. 1a, a model of a sodalite structure $(Na_8(Al_6Si_6O_{24})Cl_2)$

Referring to FIG. 1a, an iron-based zeolitic crystal structure 10 with Formula 2 is shown including the ordered A atoms 12, the B atoms 14, the O atoms 16, both the disordered A atoms and the oxygens of the disordered H$_2$O molecules are represented by the reference character 22 (as they cannot be readily distinguished vie e.g., X-ray diffraction), and the Fe atoms 18 forming the Fe environment 20. For comparison, FIG. 1b shows an analogous model of the sodalite structure 100 (of Na$_8$(Al$_6$Si$_6$O$_{24}$)Cl$_2$) with the Na atoms 102, the Cl atoms 104, the O atoms 106, the Si environments 108, and the Al environments 110. As can be seen, the iron-based zeolite crystal structure 10 having Formula 2 (FIG. 1a) exhibits a three dimensional framework analogous to that seen in sodalite of FIG. 1b. However, the iron-based zeolite crystal structure 10 has the zeolite-like crystal structure without the presence of Al or Si within the framework.

Figure 3:
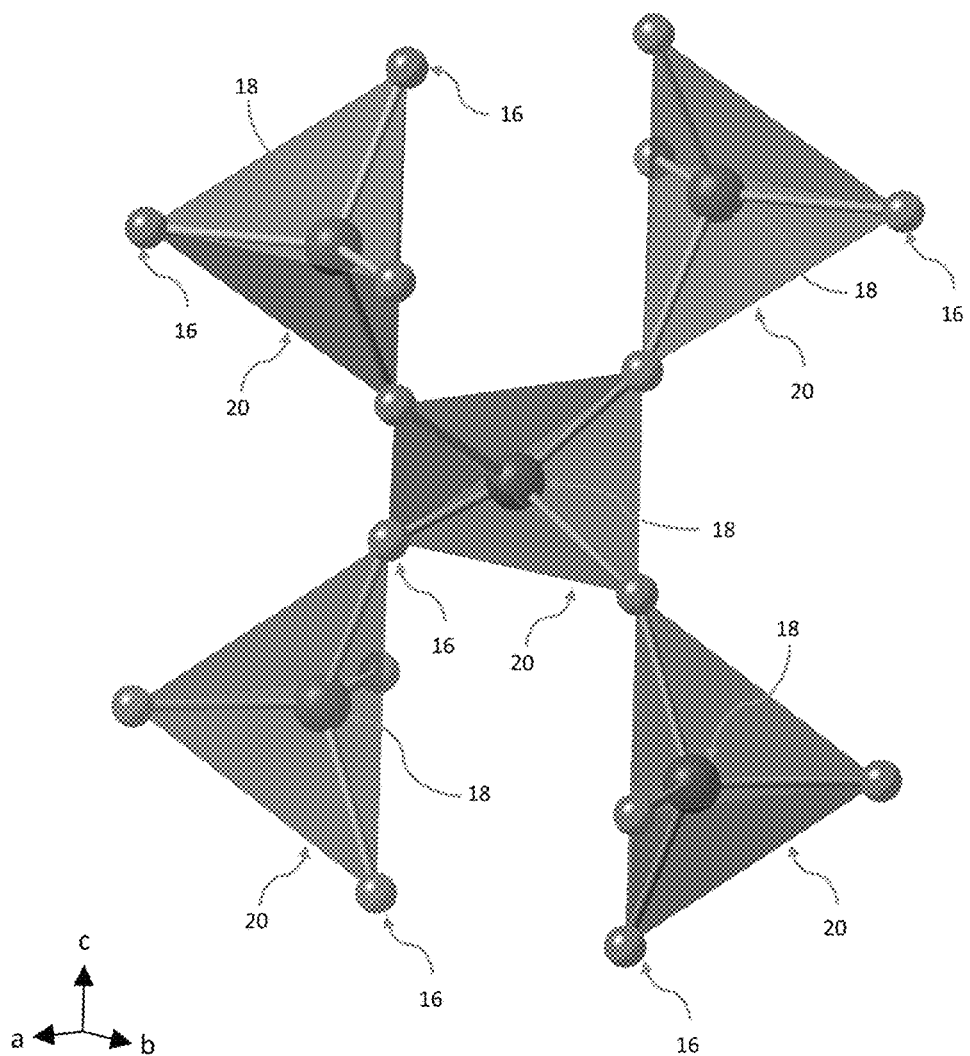
FIG. 3 shows connectivity between one $FeO_4$ tetrahedron and four surrounding units.
Figure 4:
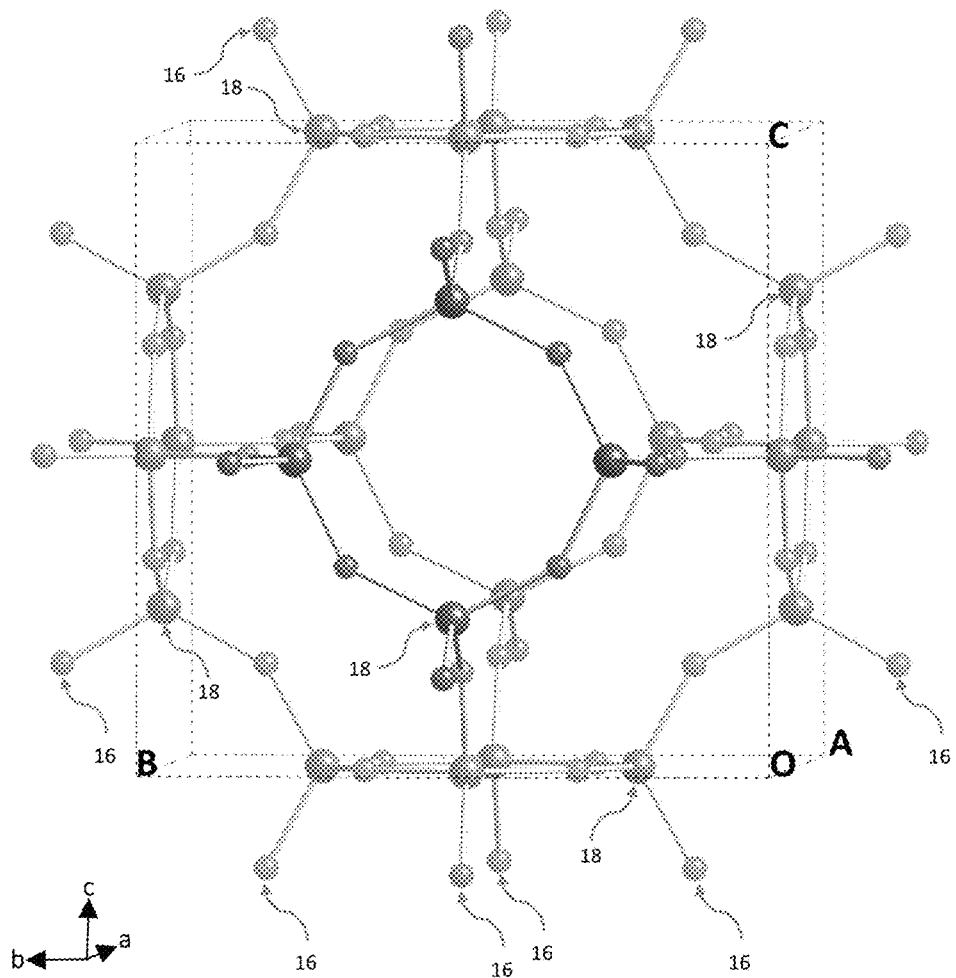
FIG. 4 shows a sodalite-like cage exhibited by the series $A_{\sim 2.8}Ba_8Fe_{12}O_{24}(O/OH)_6 \cdot xH_2O$, where A is Na, K, Cs, or a combination thereof. Disorder in some of the oxygen atoms of the $Fe_{12}O_{24}$ framework are omitted for clarity, namely the O1a oxygens in Table 2 are not shown.

The iron-based zeolite crystal structure 10 with Formula 2 is best described as a 3D framework of corner shared $FeO_4$ tetrahedra 20 with the B cations 14, A cations 12, oxygen atoms 16, and water molecules lying in cavities created by this framework. Each $FeO_4$ tetrahedron is connected to four other tetrahedra through corner-shared oxygens, as shown in FIG. 3. Pairwise, these tetrahedra link in a coplanar arrangement, where the planes are perpendicular to each other, leading to the formation of sodalite-like cages as shown in FIG. 4.

Without wishing to be bound by any particular theory, it is believed that the presence of the transition element iron (Fe) introduces electronic and magnetic properties to the iron-based zeolite crystal structure. As such, the properties of the iron-based zeolite crystal structure can be fine-tuned via doping through the A, B and Fe position to affect the oxidation state of the iron-based zeolite crystal structure.

The A position of Formula 1 comprises, in one embodiment, Na, K, or combination of Na and K. For example, A can be a combination of Na and K, with Na having an atomic percent of A that is about 90% to about 99.5% (calculated by the number of Na atoms divided by the total number of Na and K atoms, times 100). For example, in one embodiment, A can be a combination of Na and K, with Na having an atomic percent of A that is about 95% to about 99.5%. In another embodiment, the A position comprises Cs (e.g., either alone or in combination with Na and/or K).

The iron-based zeolite crystal structure 10 with Formula 1 can be formed according to a hydroflux crystal growth method, similar to that described in Chance, W. M.; Bugaris, D. E.; Sefat, A. S.; zur Loye, H-C. "Crystal Growth of New Hexahydroxometallates Using a Hydroflux" *Inorg. Chem.* 2013, 52 (20), 11723-11733 and Chance, W. M; Smith, M. D.; zur Loye, H-C. "Synthesis and Crystal Structure of Dibarium Tungstate Hydrate, $Ba_2WO_5.H_2O$" *J. Chem. Crystallogr.* 2013, doi:10.1007/s10870-013-0477-z.

In one embodiment, the iron-based zeolite crystal structure 10 with Formula 2 can be formed by reacting $Fe(NO_3)_3.9H_2O$ and $B(OH)_2.xH_2O$ in the corresponding reactive alkali hydroxide hydroflux. After reaction, the reaction product can be sonicated (e.g., in methanol) and then isolated by filtration. In one embodiment, rinsing with dilute HCl can dissolve any $BaCO_3$ formed in the process, such that it is also removed.

During its formation, iron-based zeolite crystal structure 10 with Formula 2 forms cavities that hold water, oxygen atoms, the A atoms, and the B atoms (i.e., the AEM atoms). For instance, it is believed that $Ba_8(Fe_{12}O_{24})Na_y(O/OH)_6.xH_2O$ crystallizes in the cubic space group Pm-3m, a=10.0476(1) Å with slightly distorted $FeO_4$ tetrahedra linked to form $Fe_4O_4$ and $Fe_6O_6$ rings that in turn are arranged to yield channels and internal cavities that are characteristic of the sodalite structure.

Moreover, it is believed that water can be removed by heating while maintaining the integrity of the crystalline lattice structure, though it is unclear how many water molecules are present in the iron-based zeolitic crystal structures 10. It is believed, without wishing to be bound by any particular theory, that x is 0 to about 25 for most embodiments (e.g., about $1 \leq x \leq 10$). For example, in one embodiment, a refined composition can have the formula $Na_{2.84}Ba_8Fe_{12}O_{24}(OH)_6.3H_2O$. As described further in the Examples, below dehydration of the materials can be carried out and the space group can be maintained with a slight decrease in the cubic lattice parameter.

The class of compounds synthesized and described herein represents the first examples of a zeolitic iron framework structure. Preliminary magnetic studies indicate complex magnetic behavior over a broad range of temperatures. This structure as well as conceivable additional structure types may be useful in the field of catalysis; the presence of iron cations with their unpaired electrons can promote research into new magnetic materials; and the iron combined with the presence of alkali metals (e.g., sodium, lithium, etc.) in the channels can be useful in the field of stationary power storage such as sodium or lithium batteries.

EXAMPLE 1

Experimental

Reagents: The following reagents were used as obtained: KOH (Fisher Scientific, ACS grade pellets), NaOH (Fisher Scientific, ACS grade pellets), $CsOH.H_2O$ (Alfa Aesar, 99.9%), $Ba(OH)_2.8H_2O$ (Alfa Aesar, 99+%), and $Fe(NO_3)_3.9H_2O$ (Alfa Aesar, 98%+).

Crystal Growth (Zeolite Synthesis): All products were synthesized in 23 mL PTFE-lined stainless steel autoclaves. 4 mmols of $Fe(NO_3)_3.9H_2O$ and 6 mmols of $Ba(OH)_2.8H_2O$ were reacted in the corresponding reactive alkali hydroxide hydroflux (Na hydroflux=0.2 mol NaOH/0.35 mol $H_2O$; Na/K hydroflux=0.1 mol KOH/0.1 mol NaOH/0.35 mol H2O; K hydroflux=0.2 mol KOH/0.35 mol $H_2O$; Cs hydroflux=0.1 mol CsOH/0.25 mol $H_2O$). The vessels were heated in a programmable oven from room temperature to 180° C. at 5° C./min, then to 230° C. at 0.3° C./min, held for 1 day, then slow cooled at a rate of 0.1 to 0.3° C. per minute to 80° C. The products were sonicated in methanol for about an hour, filtered by vacuum filtration to isolate, and then quickly washed in dilute HCl.

Crystal Growth (Na/K Synthesis): $Fe(NO_3)_3.9H_2O$ (2.79 mmol), $Ba(OH)_2.8H_2O$ (3.70 mmol), KOH (11.2 g), and $H_2O$ (4.5 g) were loaded into a 23 mL PTFE lined stainless steel autoclave. The vessel was heated in a programmable oven from room temperature to 180° C. at a rate of 5° C./min, then to 230° C. at 0.3° C./min, held for one day, then slow cooled at a rate of 0.1-0.3° C. per minute to 80° C. The products were sonicated in methanol for about an hour, filtered by vacuum filtration, and then quickly washed in dilute HCl. The sodium content came from the sodium impurity present in the potassium hydroxide.

Magnetic Measurements: The DC magnetic susceptibilities were measured as a function of temperature using a Quantum Design MPMS SQUID VSM. Ground, polycrystalline samples were measured in gelatin capsules. The diamagnetic background of the sample holder was not subtracted due to its very small contribution to the measured moment. For a typical temperature sweep experiment, the sample was first cooled to 4 K under zero-field cooled (zfc) conditions and data were collected upon warming to 300 K in an applied field of 1000 Oe. Then the sample was field cooled (fc) to 4 K from room temperature in 1000 Oe while data were collected. Field sweeps were performed from 0-7 T, then to −7 T, and back to 0 T.

Structure Determination: X-ray intensity data were collected for all samples at 296(2) K using a Bruker SMART APEX diffractometer (Mo Kα radiation, λ=0.71073 Å). The raw area detector data frames were reduced and corrected for absorption effects using the SAINT+ and SADABS programs. The initial structural model was obtained by direct methods using SHELXS. Subsequent difference Fourier calculations and full-matrix least-squares refinement against $F^2$ were performed with SHELXL-2013/4 using the SheIXIe interface. In this example, only the structure of the Na analogue is reported. All other analogues are isostructural, with variations in the lattice parameter. Structure refinement information for $Na_{-2.8}Ba_8Fe_{12}O_{24}(O/OH)_6 \cdot xH_2O$ is listed in Tables 1 and 2. Specifically, Table 1 shows the crystallographic Data for $Na_{-2.8}Ba_8Fe_{12}O_{24}(OH)_6 \cdot 0.6 \cdot 3H_2O$.

TABLE 1

| | |
|---|---|
| formula weight (g/mol) | 2421.70 |
| color and habit | amber, block |
| Crystal system | cubic |
| Space group | Pm-3 m |
| a (Å) | 10.04760(10) |
| V (Å$^3$) | 1014.35(3) |
| Z | 1 |
| $\rho_c$ (g cm$^{-3}$) | 3.964 |
| $\mu$ (mm$^{-1}$) | 11.889 |
| F(000) | 1088 |
| $\theta_{max}$ (°) | 36.286 |
| index ranges | −16 ≤ h ≤ 14, |
| | −16 ≤ k ≤ 14, |
| | −16 ≤ l ≤ 14 |
| reflections collected | 23595 |
| independent reflections | 552 |
| goodness-of-fit on F$^2$ | 1.109 |
| R indices | R1 = 0.0335, |
| (all data) | wR2 = 0.0552 |
| largest residual electron density peak and hole (e$^-$ Å$^{-3}$) | 1.096/−0.861 |

Table 2 shows the atomic coordinates (×10,000) and equivalent isotropic displacement parameters (Å$^2$) (×1,000) for $Na_{-1}Ba_8Fe_{12}O_{24}(O/OH)_6 \cdot xH_2O$. $U_{eq}$ is defined as one third of the trace of the orthogonalized $U_{ij}$ tensor.

TABLE 2

| | Occ | x | y | z | U(eq) |
|---|---|---|---|---|---|
| Ba(1) | 1 | 2036(1) | 2036(1) | 2036(1) | 15(1) |
| Fe(1) | 1 | 5000 | 2504(1) | 0 | 11(1) |
| Na(1) | 1 | 0 | 0 | 0 | 14(1) |
| O(1A) | 0.5 | 5000 | 1719(6) | 1719(6) | 21(2) |
| O(1B) | 0.5 | 5000 | 1380(6) | 1380(6) | 21(2) |
| O(2) | 1 | 3391(2) | 3391(2) | 0 | 19(1) |
| O(3) | 1 | 2315(5) | 0 | 0 | 19(1) |
| H(3) | 1 | 0.320(2) | 0.0 | 0.0 | 0.028 |
| Na(2) | 0.35(4) | 5000 | 5000 | 5000 | 45(10) |
| Na(3) | 0.249(11) | 5000 | 5000 | 2301(17) | 44(1) |
| O(4) | 0.132(4) | 4165(15) | 3690(16) | 3238(15) | 44(1) |

Results and Discussion

Synthesis: Crystals were readily produced under the conditions reported above. An excess of $Ba(OH)_2 \cdot 8H_2O$ was found to promote nearly quantitative yield with respect to $Fe(NO_3)_3 \cdot 9H_2O$. Using less barium precursor led to poor yield and formation of an unidentified iron containing byproduct. $Fe_2O_3$ was tested as a precursor, but was found to be inferior to the nitrate. This is most likely related to a mismatch between reaction kinetics and dissolution rate of the $Fe_2O_3$ in the hydroflux.

Figure 2A:
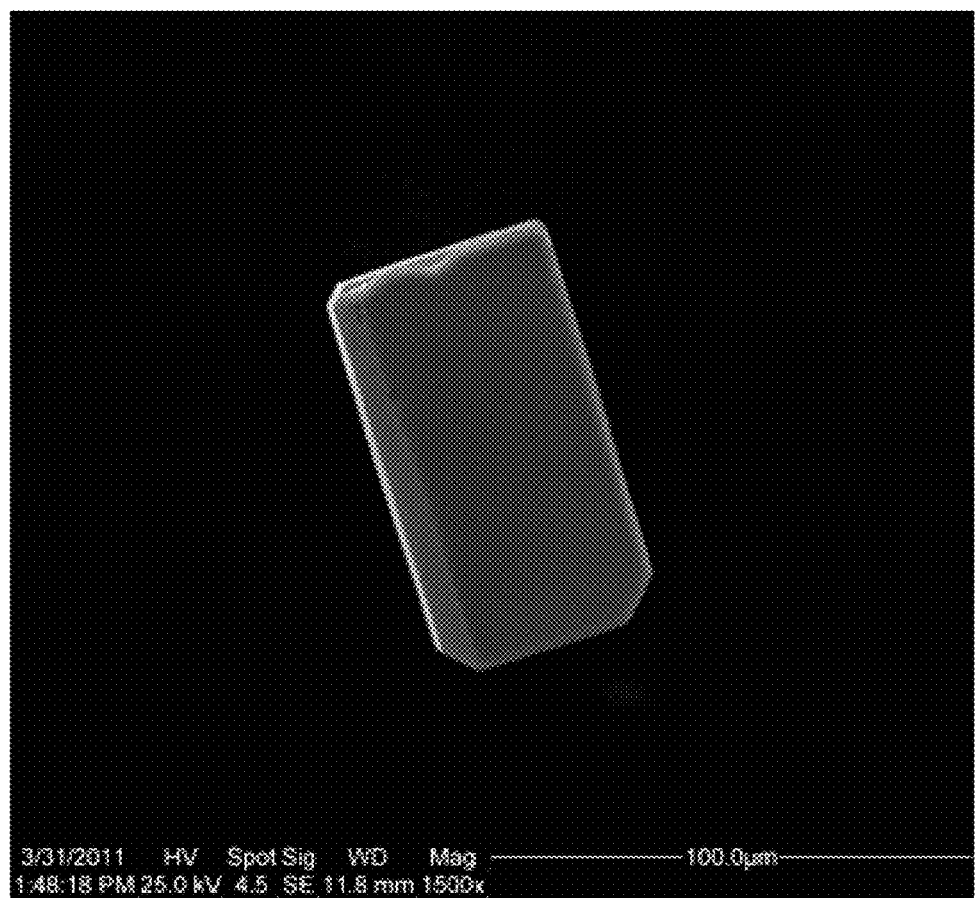
FIG. 2a shows a scanning electron micrograph images of crystals of $(Na/K)_{\sim 1.5}Ba_8Fe_{12}O_{24}(O/OH)_6 \cdot xH_2O$.
Figure 2B:
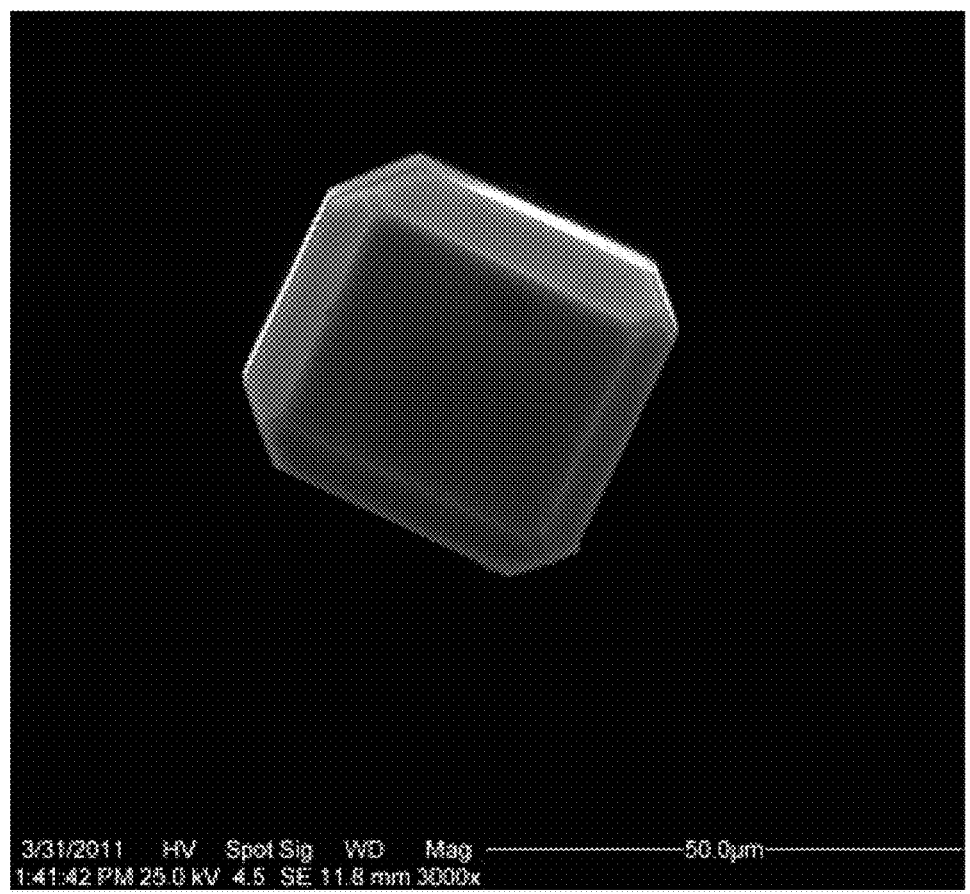
FIG. 2b shows another scanning electron micrograph images of crystals of $(Na/K)_{\sim 1.5}Ba_8Fe_{12}O_{24}(O/OH)_6 \cdot xH_2O$.
Figure 5A:
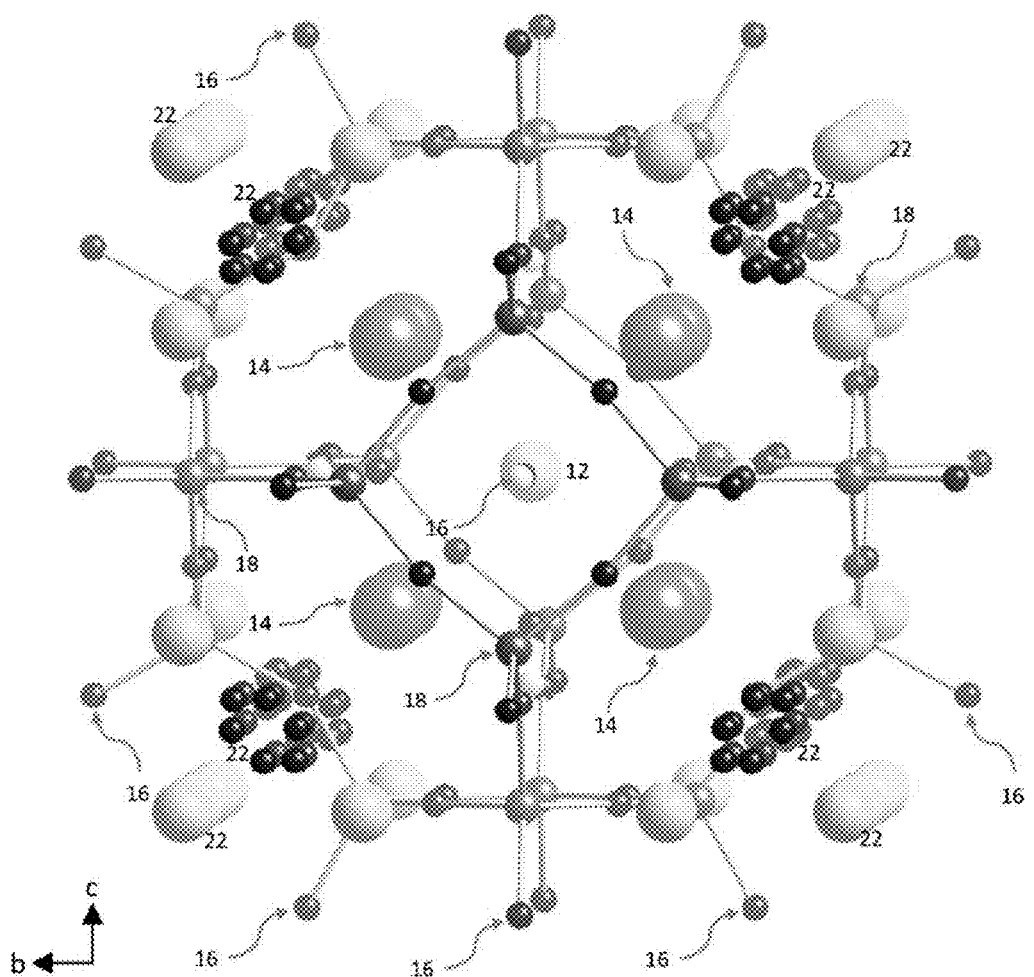
FIG. 5a shows a unit cell of $Na_{\sim 2.8}Ba_8Fe_{12}O_{24}(O/OH)_6 \cdot xH_2O$ down the a axis. Hydrogen atoms associated with the water molecules are not shown and disorder in some of the oxygen atoms of the $Fe_{12}O_{24}$ framework are omitted for clarity, namely the O1a oxygens in Table 2 are not shown.
Figure 5B:
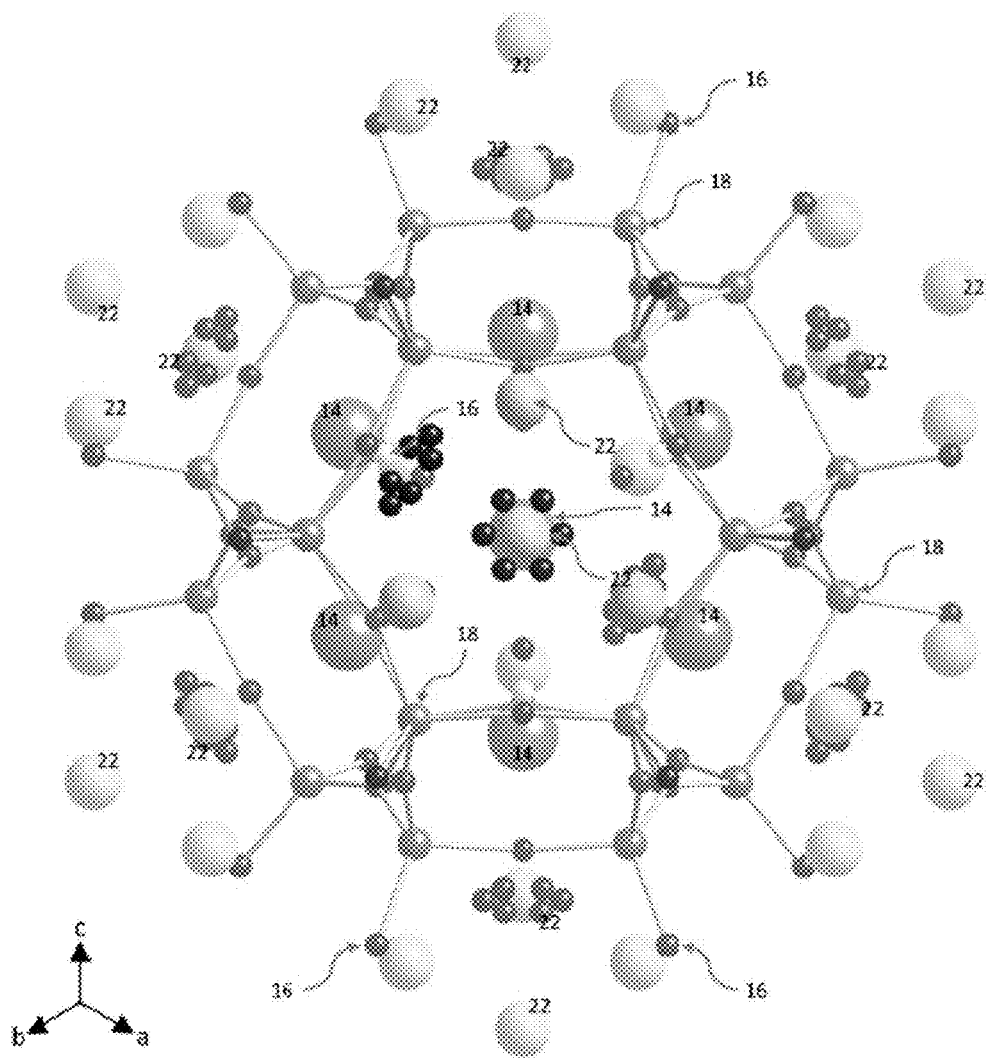
FIG. 5b shows a unit cell of $Na_{\sim 2.8}Ba_8Fe_{12}O_{24}(O/OH)_6 \cdot xH_2O$ down the [111] lattice vector. Hydrogen atoms associated with the water molecules are not shown and disorder in some of the oxygen atoms of the $Fe_{12}O_{24}$ framework are omitted for clarity, namely the O1a oxygens in Table 2 are not shown.

Structure: All compounds adopted a cubic variation of the sodalite structure, as shown in FIG. 1a and took on block-like crystal morphologies with truncated corners (See e.g., FIG. 2a and FIG. 2b). As discussed broadly above, the crystal structure formed is best described as a 3D framework of corner shared $FeO_4$ tetrahedra with alkaline earth metals (e.g., barium), alkali metals, oxygen or hydroxide and water lying in the cavities created by this framework. Each $FeO_4$ tetrahedron is connected to four other tetrahedra through corner-shared oxygens. (See e.g., FIG. 3). Pairwise, these tetrahedra link in a coplanar arrangement, where the planes are perpendicular to each other. This leads to the formation of sodalite-like cages. (See e.g., FIG. 4). The cages adopt a body centered cubic arrangement within each unit cell and contain four-member rings of corner-shared tetrahedra in the faces of the unit cell that link to cages in adjacent unit cells. In addition, six-member rings of $FeO_4$ tetrahedra are oriented down the body diagonals of the unit cell. (See e.g., FIG. 5) The A atoms are octahedrally coordinated by six O or OH to form an $A(O/OH)_6$ (e.g., $Na(O/OH)_6$) unit that is cubically surrounded by 8 B atoms (e.g., Ba atoms) such that the each O or OH of the $A(O/OH)_6$ unit lies on a face center of the $B_8$ cube. This $B_8A(O/OH)_6$ (e.g., $Ba_8Na(O/OH)_6$) unit occupies half of the sodalite cages with the other half being occupied by disordered water molecules and/or A atoms (e.g., Na atoms).

Magnetism: The temperature dependence of the magnetic susceptibilities ($\chi$) were measured of the under zfc and fc conditions. Temperature dependence of the inverse susceptibility data were fit to the Curie-Weiss law where $\chi=C/(T-\theta)$; C is the Curie constant, $\theta$ is the paramagnetic Weiss temperature. Both the Na and Na/K analogue exhibit strong deviations from Curie-Weiss behavior.

Figure 6:
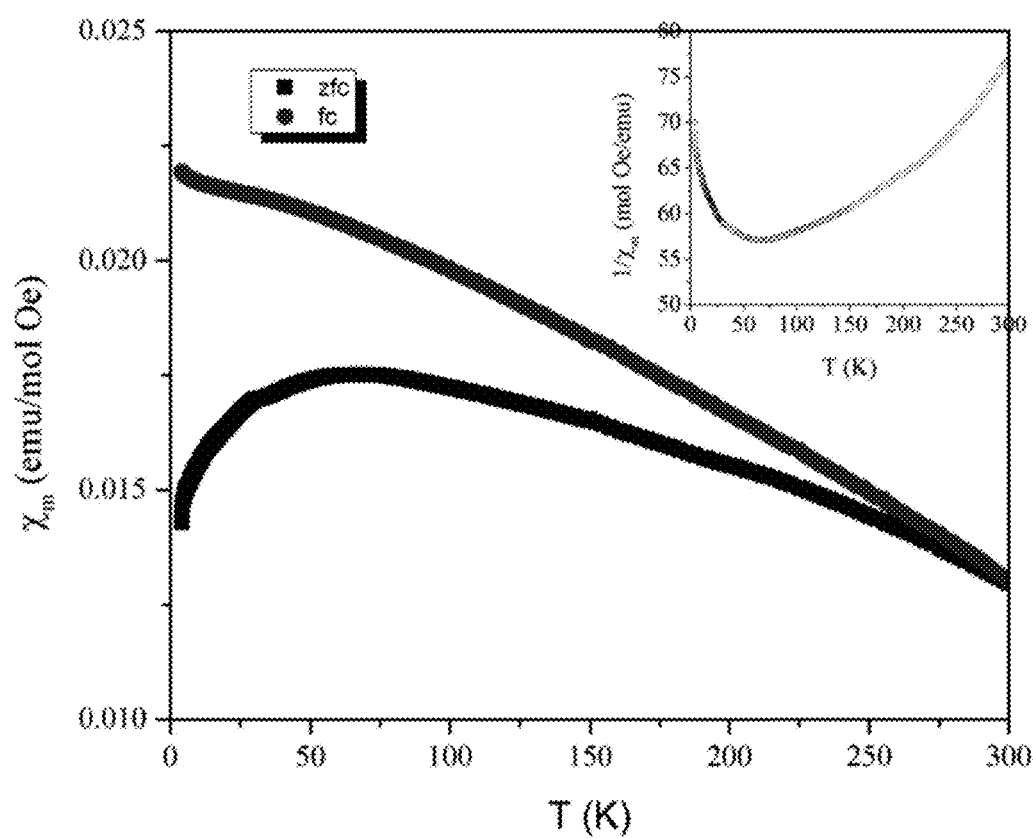
FIG. 6 shows the temperature dependence of the molar magnetic susceptibility, $\chi_m$, of $Na_{\sim 2.8}Ba_8Fe_{12}O_{24}(O/OH)_6 \cdot xH_2O$ measured under zfc and fc conditions. Inset is an inverse magnetic susceptibility, $1/\chi_m$, plot of the zfc data.
Figure 7:
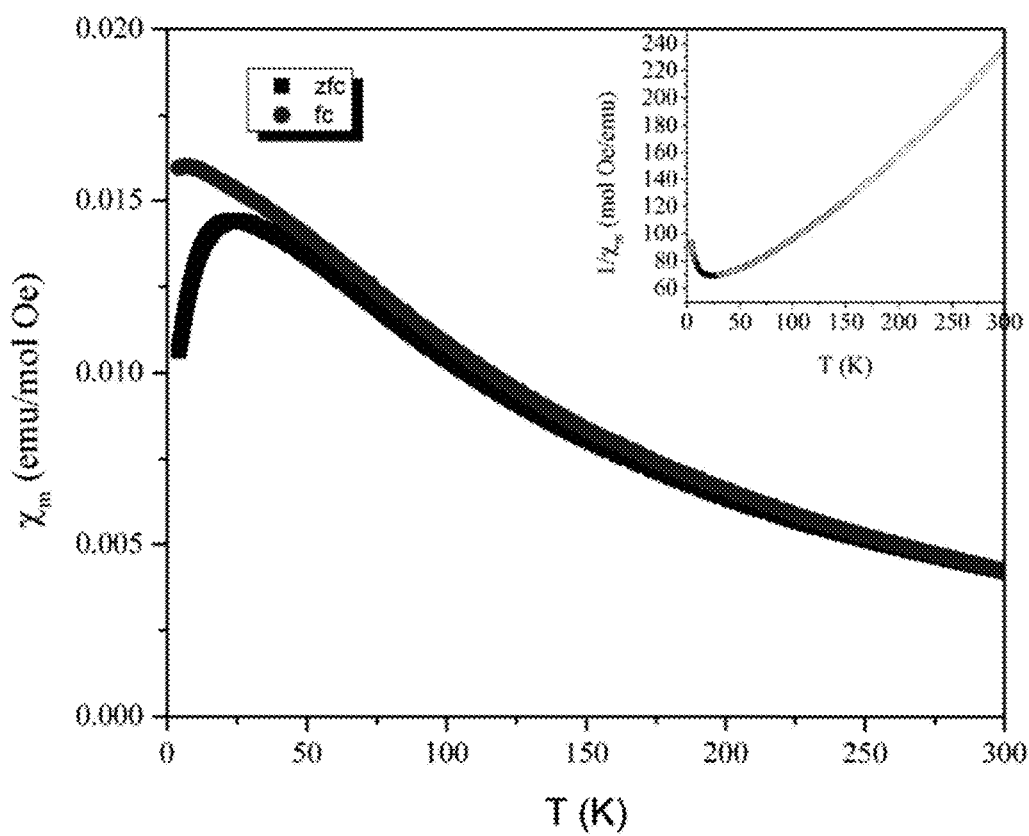
FIG. 7 shows the temperature dependence of the molar magnetic susceptibility, $\chi_m$, of $(Na/K)_{\sim 1.5}Ba_8Fe_{12}O_{24}(O/OH)_6 \cdot xH_2O$ measured under zfc and fc conditions. Inset is an inverse magnetic susceptibility, $1/\chi_m$, plot of the zfc data.
Figure 8:
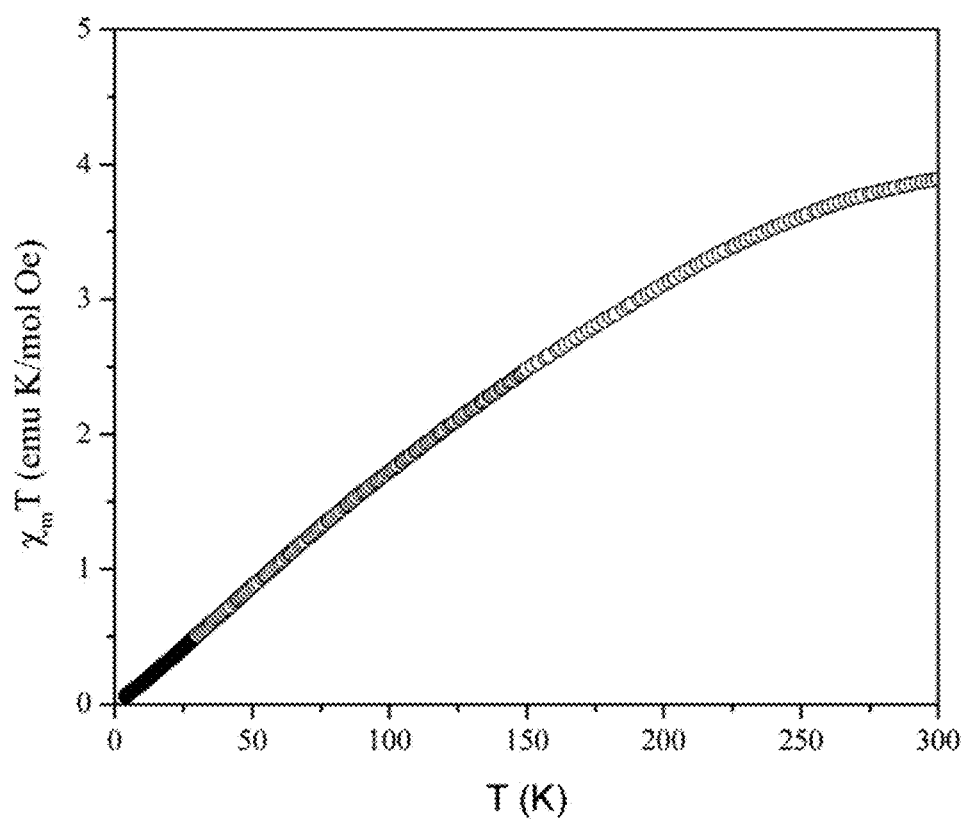
FIG. 8 shows $\chi_m T$ vs. T plot for of $Na_{\sim 2.8}Ba_8Fe_{12}O_{24}(O/OH)_6 \cdot xH_2O$ (zfc conditions, 1000 Oe applied field).
Figure 9:
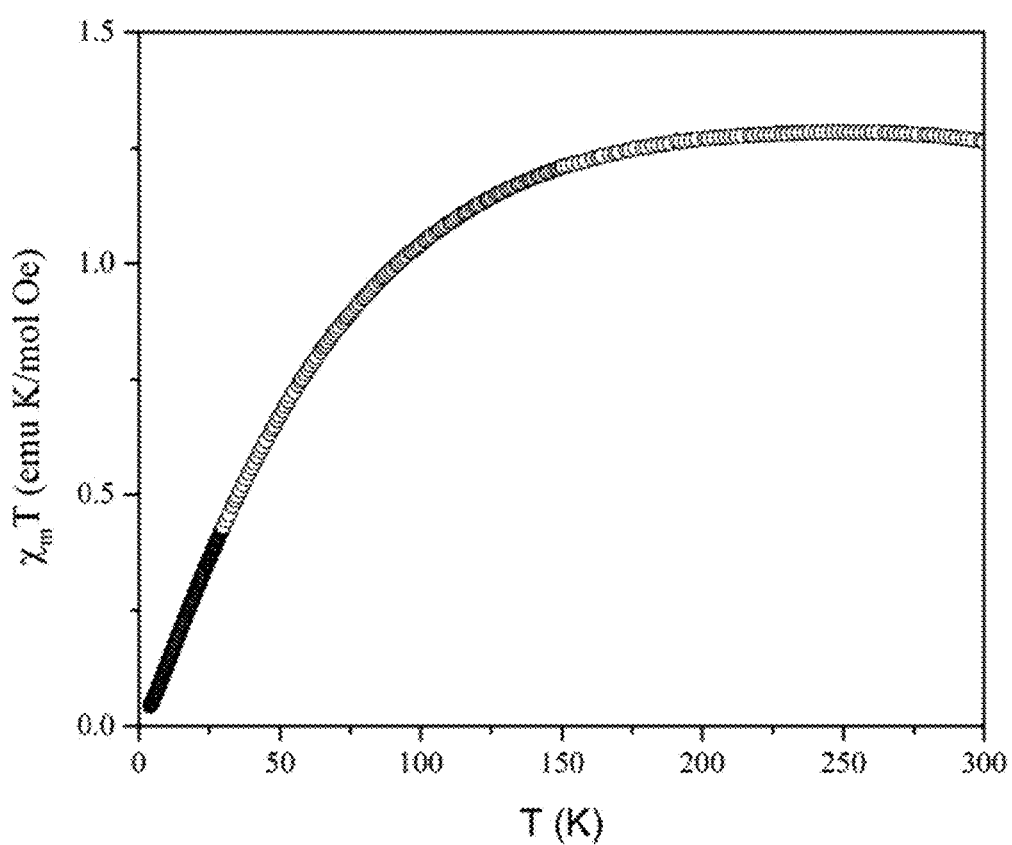
FIG. 9 shows $\chi_m T$ vs. T plot for of $(Na/K)_{\sim 1.5}Ba_8Fe_{12}O_{24}(O/OH)_6 \cdot xH_2O$ (zfc conditions, 1000 Oe applied field).

The $\chi_m$ vs. T and $1/\chi_m$ vs. T plots are shown in FIG. 6 and FIG. 7. The observed divergence in the zfc and fcc data at low temperatures suggests the possibility of a canted antiferromagnetic ground state with spin frustration or a spin glass. The inverse susceptibility plot is nonlinear over the entire temperature range measured and cannot be readily fit to the Curie law. Furthermore, the $\chi_m$ T vs. T plots (FIG. 8 and FIG. 9) show a complex change in the moment as a function of the temperature.

Figure 10:
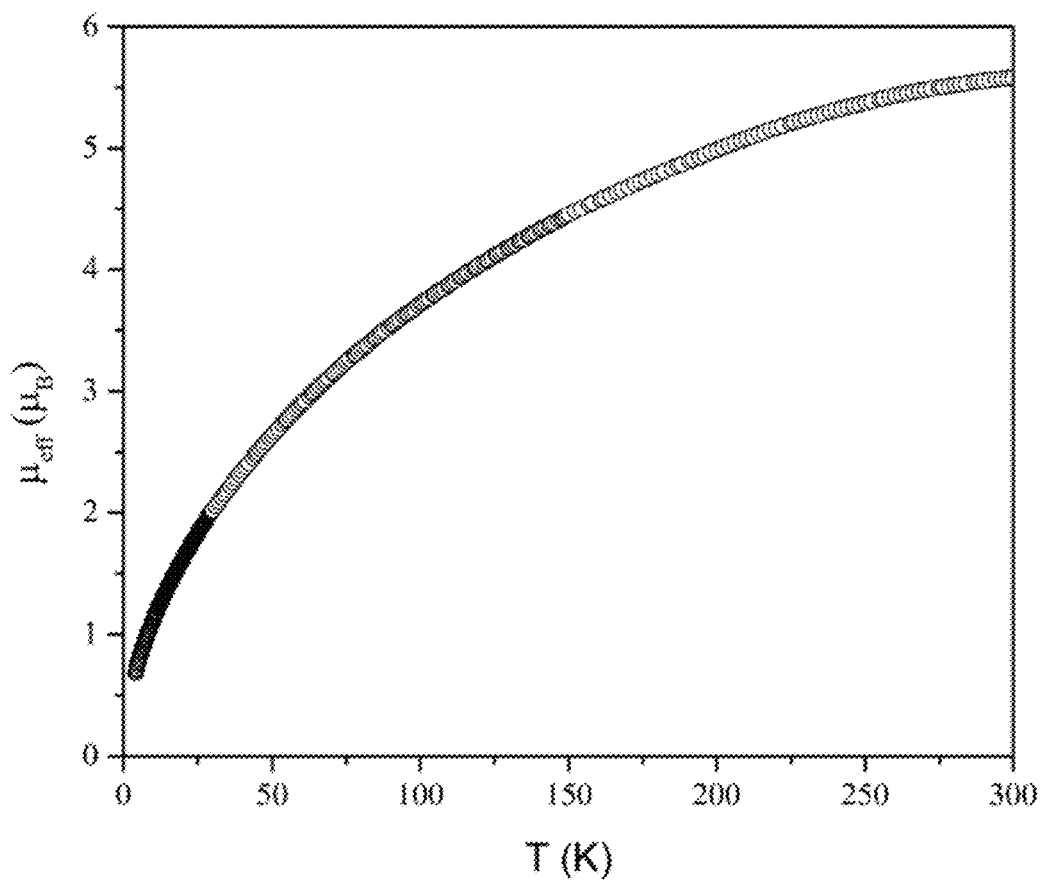
FIG. 10 shows $\mu_{eff}$ vs. T plot for $Na_{\sim 2.8}Ba_8Fe_{12}O_{24}(O/OH)_6 \cdot xH_2O$ (zfc conditions, 1000 Oe applied field).
Figure 11:
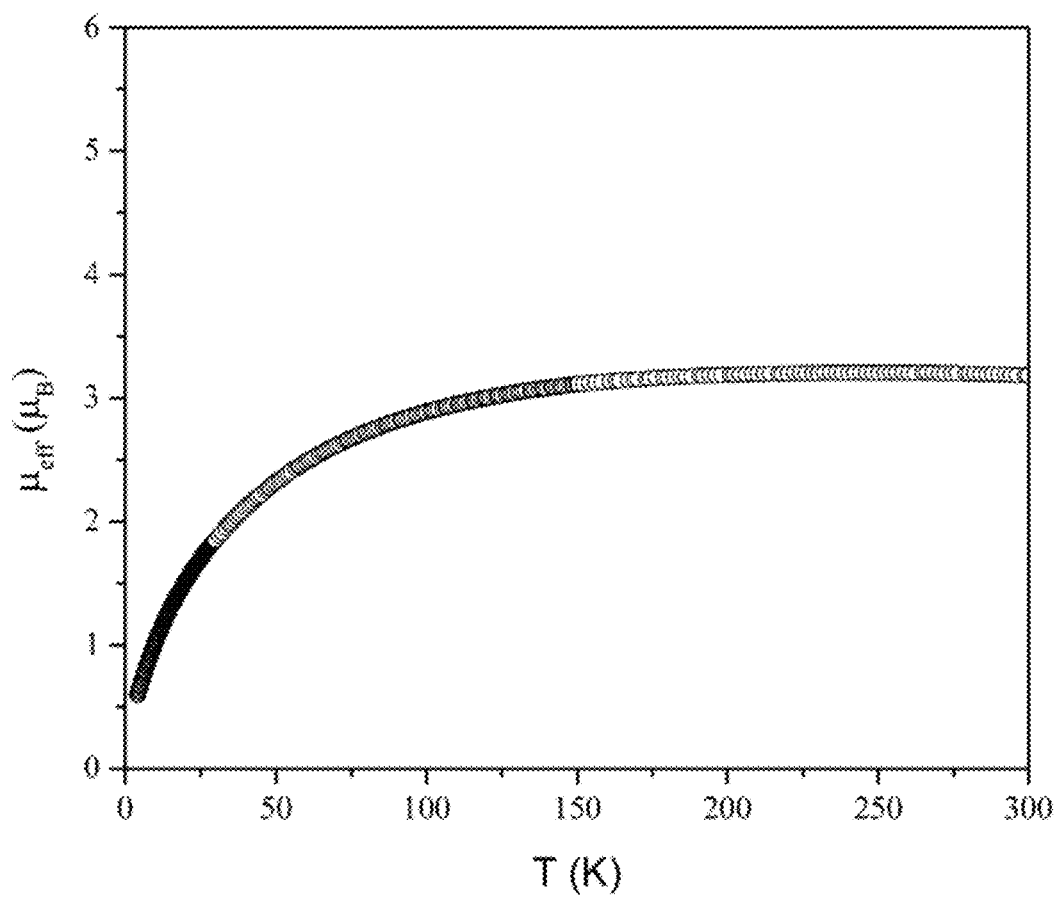
FIG. 11 shows $\mu_{eff}$ vs. T plot for $(Na/K)_{\sim 1.5}Ba_8Fe_{12}O_{24}(O/OH)_6 \cdot xH_2O$ (zfc conditions, 1000 Oe applied field).
Figure 12:
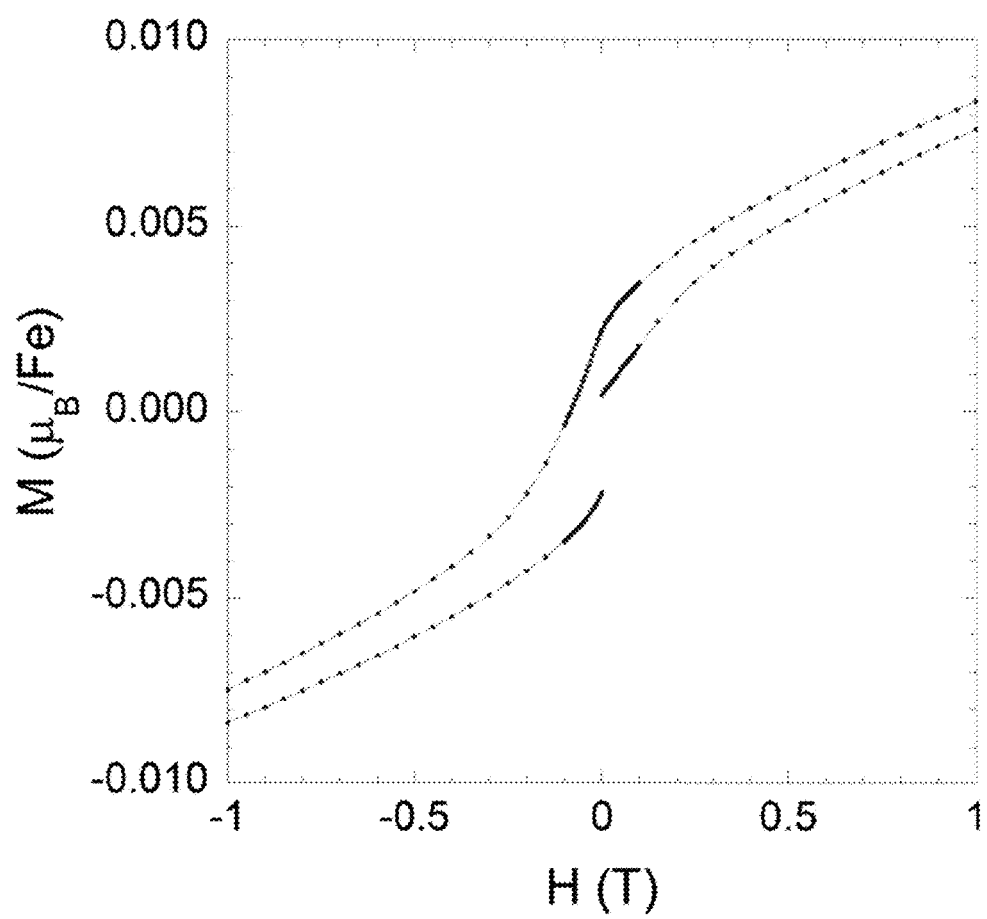
FIG. 12 shows the magnetization curves (M vs. H) for $Na_{\sim 2.8}Ba_8Fe_{12}O_{24}(O/OH)_6 \cdot xH_2O$ at 4 K.

In samples with complex behavior, a plot of $\mu_{eff}$ vs. T (FIG. 10 and FIG. 11) can be useful in determining the effective moment per magnetic ion, where $\mu_{eff}=(7.977 \chi_m T)^{1/2}$. The effective moments observed at 300 K are $5.57\mu_B$ and $3.18\mu_B$ for the Na and Na/K analogue, respectively. This is lower than the expected spin-only value of $5.92\mu_B$ (for g=2) for a tetrahedral high-spin $Fe^{3+}$ ion. This behavior indicates the presence of antiferromagnetic interactions between $Fe^{3+}$ ions. Previous investigations have shown that the measured effective magnetic moment is much smaller than the theoretical magnetic moment in a number of related iron and cobalt oxides such as, for example, $BaKFeO_3$, $Ba_3Fe_2O_6$, and $Ba_4KFe_3O_9$ as well as cobalt(IV) compounds $Cs_2CoO_3$, $Rb_2CoO_3$, and $K_2CoO_3$. In some of these cases, it was suggested that the large discrepancy between the observed and theoretical magnetic moments is due to long-range antiferromagnetic ordering with Neel temperatures above the range of the magnetic measurement. It is possible that this scenario applies to this zeolitic structure because of the close proximity and arrangement of magnetic centers. For $Na_{1.5}Ba_8Fe_{12}O_{24}(O/OH)_6 \cdot 8H_2O$, a field sweep was collected at 4K. These data are presented in FIG. 12. The compound exhibits soft magnetic behavior at 4 K with a low coercive field (<1000 Oe) with no observed saturation field, suggesting the assignment of a spin glass.

EXAMPLE 2

$Fe(NO_3)_3 \cdot 9H_2O$ (4.28 mmol), $Ba(OH)_2 \cdot 8H_2O$ (4.28 mmol), NaOH (9 g), and $H_2O$ (7 g) were heated at 230° C. in a PTFE lined stainless steel autoclave for 24 hours followed by slow cooling at a rate of 0.3° C./min to 80° C. Block crystals measuring 0.05 to 0.1 mm in size with truncated corners were isolated in nearly quantitative yield by removing the residual flux with methanol aided by sonication. Crystals of the both the unheated (original growth from hydroflux) and heated compounds were transparent brown cubes.

Structure was determined using a combination of single crystal X-ray diffraction, powder neutron diffraction, and powder synchrotron X-ray diffraction.

X-ray intensity data measurements were made using a Bruker D8 QUEST diffractometer equipped with a PHOTON 100 CMOS area detector and an Incoatec microfocus source (Mo Kα radiation, λ=0.71073 Å). All crystal surveyed indexed to a primitive cubic unit cell with a ~10.0 Å. All data collections covered 100% of reciprocal space to a minimum $2\theta_{max}$=65°, with high average reflection redundancies (>13). Raw area detector data frames were reduced and corrected for absorption effects using the SAINT+ and SADABS programs. Final unit cell parameters were determined by least-squares refinement of large sets of strong reflections (I>10σ(I)) taken from each data set. An initial structural model was obtained with SHELXS using direct methods. Subsequent difference Fourier calculations and full-matrix least-squares refinement against $F^2$ were performed with SHELXL-2014 using the SheIXIe interface.

Magnetic susceptibility was measured using a Quantum Design MPMS3 SQUID magnetometer equipped with an oven attachment. A ground sample massing 4.58 mg was loaded into a pouch made of silver foil, which was then crimped shut. For low temperature measurements the pouch was mounted to a quartz paddle using GE-7031 varnish. For high temperature measurements, the pouch was embedded in ZIRCAR cement and mounted to an oven stick. The zero-field cooled and field cooled cooling magnetic susceptibilities were measured as a function of temperature between 2 and 700 K in an applied field of 1000 Oe. The sample was removed from the magnetometer to change mounts at 300 K. The magnetization as a function of field was collected at 2 K prior to heating in the oven attachment. For all measurements, the measured magnetic moment was corrected for the diamagnetic contribution of the silver pouch.

The samples investigated by Mössbauer spectroscopy contained 10-30 mg of finely ground powder dispersed in an inert eicosane matrix. The spectrometer was operated in a constant acceleration mode, used a ~100 mCi 57Co(Rh) source, and allowed for applied fields parallel to the observed γ-radiation. Field- and temperature-dependent spectra were recorded using a Mössbauer spectrometer equipped with a Janis 8DT Super Varitemp cryostat that was outfitted with an 8 T superconducting magnet. Isomer shifts are quoted against the centroid of a room-temperature spectrum recorded for a standard iron metal foil. Mössbauer spectral simulations were performed using the VVMOSS software (See Co., formerly WEB Research Co., Edina, Minn.), see below.

The $^{57}$Fe Mössbauer spectra were analyzed using the hyperfine field distribution (HFD) model developed by Rancourt et al. This approach allowed for a distribution of hyperfine splitting parameters with an arbitrary shape to be described in terms of a discrete sum of individual Gaussian components. The individual spectral components could be satisfactorily represented using a single Gaussian HFD of magnetic fields acting on the 57Fe nuclei. Each HFD component is described by three parameters, namely, p [%]—a weight factor which (the f-recoilless factors were assumed identical for the two fractions); z [T] and dz [T]—the centroid and the width of the Gaussian HFD. Additionally, several parameters were needed to describe the elemental sextet spectra comprising the HFD: F—the full width at half maximum (FWHM) of the intrinsic Lorentzian line shape, δ—the isomer shift, ε—the electric field gradient (EFG) tensor component along the internal field, and h1/h3 and h2/h3—the height ratios of the outer (1, 6) lines to the inner (3, 4) lines and of the middle (2, 5) lines to the inner (3, 4) lines, respectively.

The $Ba_8(Fe_{12}O_{24})Na_y(O/OH)_6 \cdot xH_2O$ crystallized in the space group Pm-3m with a cubic lattice parameter of a=10.0476(1) Å. The iron ions were found in slightly irregular $FeO_4$ tetrahedra with bond lengths of 1.7883(9)(1) Å [Fe—O(1)] and 1.8458(10) Å [Fe—O(2)] (dehydrated 1.785(3)(1) Å [Fe—O(1)] and 1.8477(14) Å [Fe—O(2)]. Each $FeO_4$ tetrahedron was connected to four other tetrahedra, in the process creating planar $Fe_4O_4$ rings and puckered $Fe_6O_6$ rings.

Figure 13:
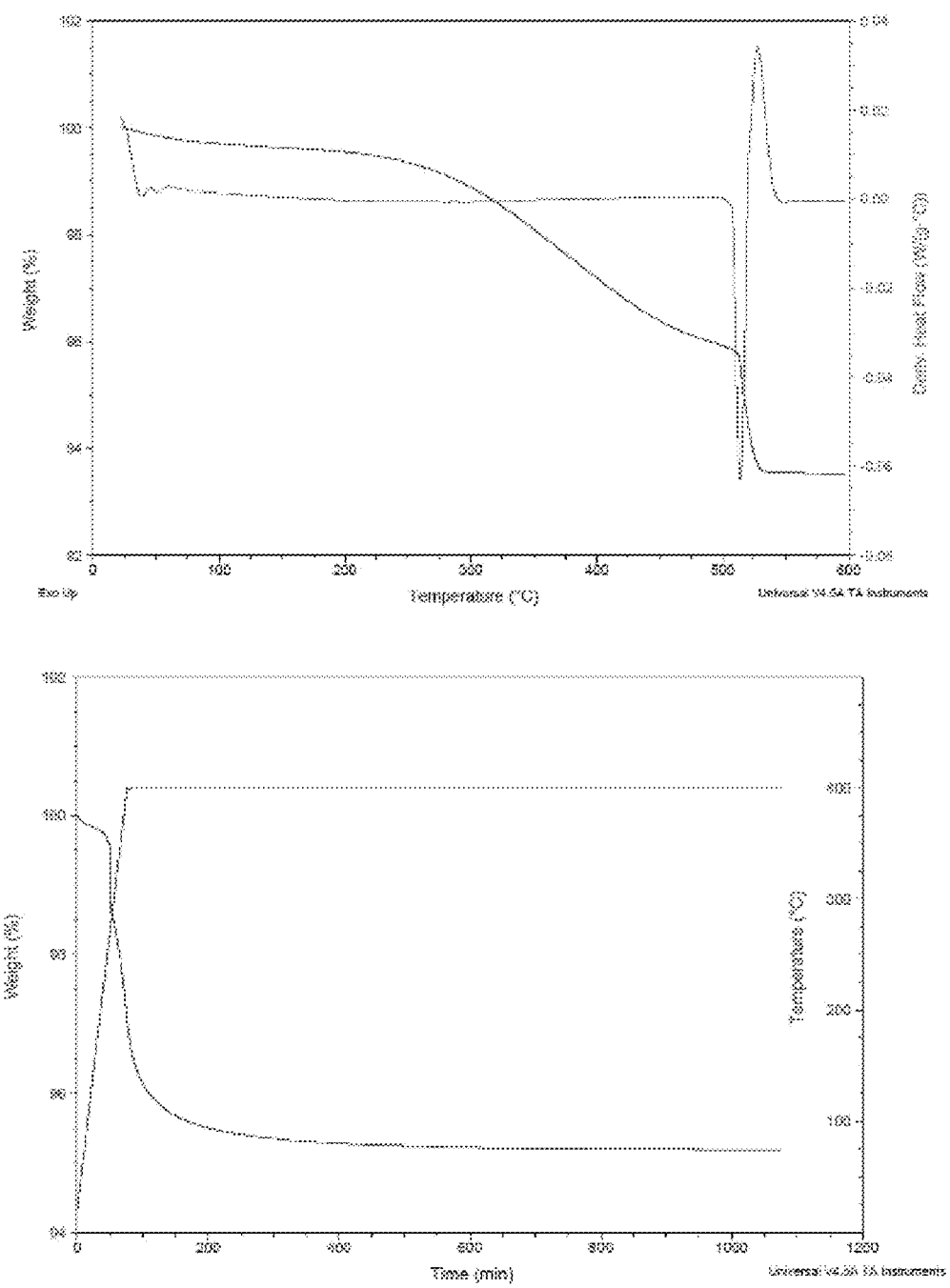
FIG. 13 presents TGA data showing that the framework decomposes just above 500° C. (top) and that the dehydrated material can be prepared via an isothermal heating at 400° C. overnight (bottom).

TGA data shown in FIG. 13 demonstrates that it was possible to remove water from the central cavity. As the sample was heated, water continued to be lost until at just above 500° C. the material thermally decomposed, as verified by powder X-ray diffraction. As shown in FIG. 13 (bottom), essentially all the water can be removed by heating at 400° C. for extended periods of time to obtain a dehydrated composition. Once this was achieved, the X-ray structure solution improved as significantly as less electron density occupied the channels and central cavities. To assist in assigning the electron density, ICP-OES elemental analysis was carried out. A batch of ground crystals gave an average composition of $Na_{3.165}Ba_{7.955}Fe_{12}O_x$. One sodium cation (Na1) was crystallographically ordered, leaving 2.16 sodium cations for the central cavity. The crystallographically determined composition of $Na_{2.84}Ba_8Fe_{12}O_{24}(O/OH)_6 \cdot 6.3(H_2O)$ was in reasonably good agreement with the ICP-OES data, the main discrepancy arising from the concentration of the disordered sodium content in the channel. More importantly, however, this confirmed the crystallographically well defined framework composition. As expected for a rigid framework structure, the lattice parameter of the dehydrated zeolite a=10.0275(3) Å, changed very little from the hydrated version, a=10.0476(1) Å.

Figure 14:
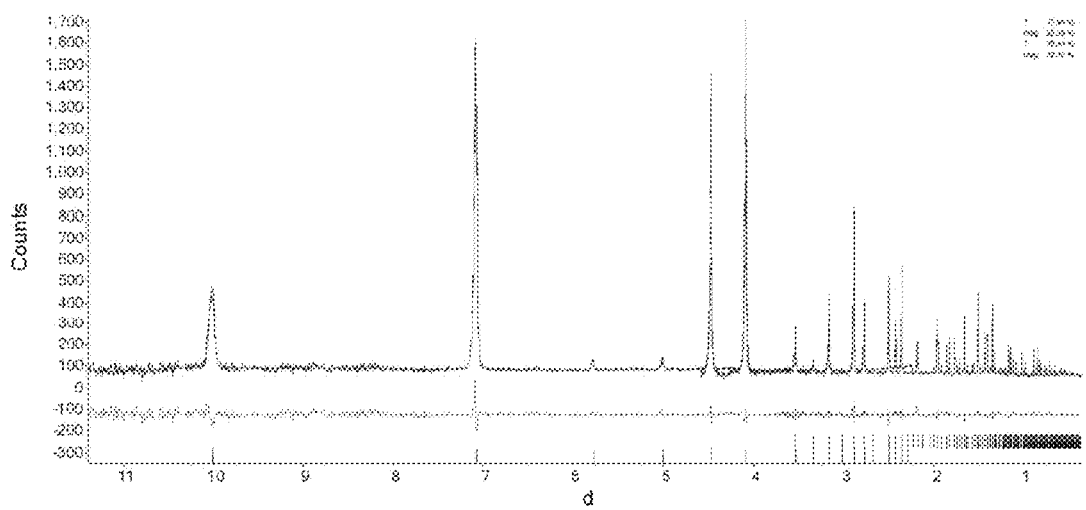
FIG. 14 presents Pawley refinement of merged neutron diffraction data from banks 2 and 4 for dehydrated material measured at 300K.

To obtain a better understanding of the crystal structure and to explore the existence of potential low temperature phase transitions, variable temperature powder neutron diffraction experiments were carried out at the POWGEN beamline at the SNS at ORNL. Approximately 5 g samples of the hydrated and the dehydrated zeolite were loaded into vanadium cans and diffraction patterns were collected between 10 K and 300 K. The Pawley refinement of the 300 K dehydrated data set is shown in FIG. 14. Here also, the electron density in the central cavity was refined as arising from the presence of two sodium cations as well as hydrogen atoms. No magnetic peaks were observed down to 10 K and no evidence for a structural transition was observed. Other than the expected temperature-induced contraction of the a-lattice parameter, the structure remained unchanged, including in the hydrated sample for which the water molecules remain disordered in the channels.

Figure 15:
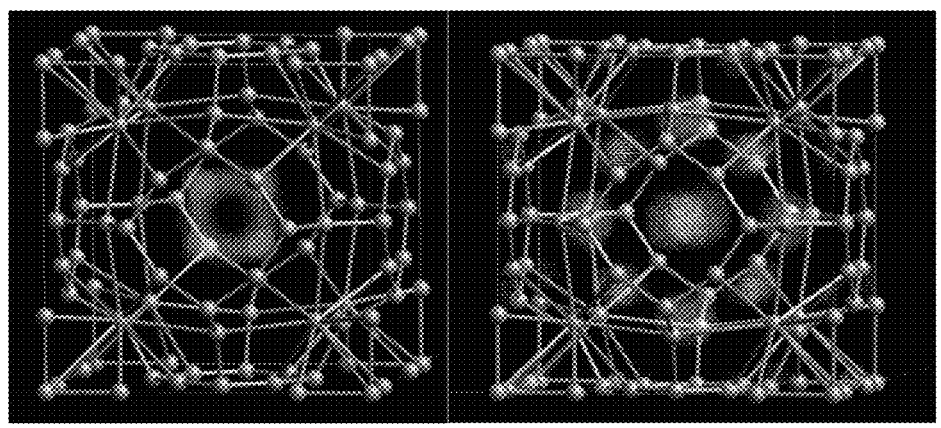
FIG. 15 illustrates the Fourier difference from simulated annealing (SA) showing residual positive scattering in the cavity in the right panel and in the left panel is shown Fourier difference from SA showing residual negative density in the cavity that surrounds the positive scattering shown in the panel at right.

A Fourier difference map of the dehydrated sample (FIG. 15) showed positive scattering in the cavity surrounded by negative density, consistent with the presence of sodium cations inside the central cavities.

Figure 16A:
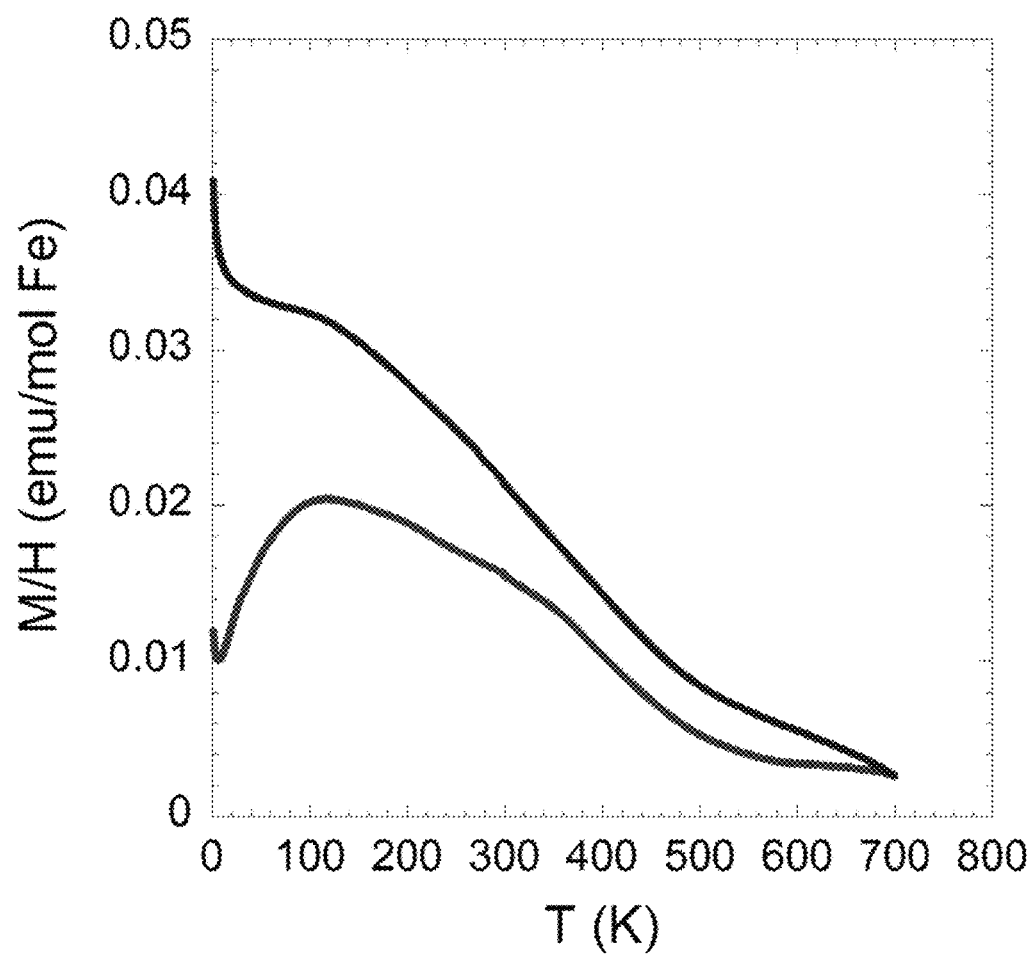
FIG. 16a presents zfc and fc data collected at 1000 Oe for $Na_{\sim 2.2}Ba_8Fe_{12}O_{24}(O/OH)_6$. Data collected at 2K.
Figure 16B:
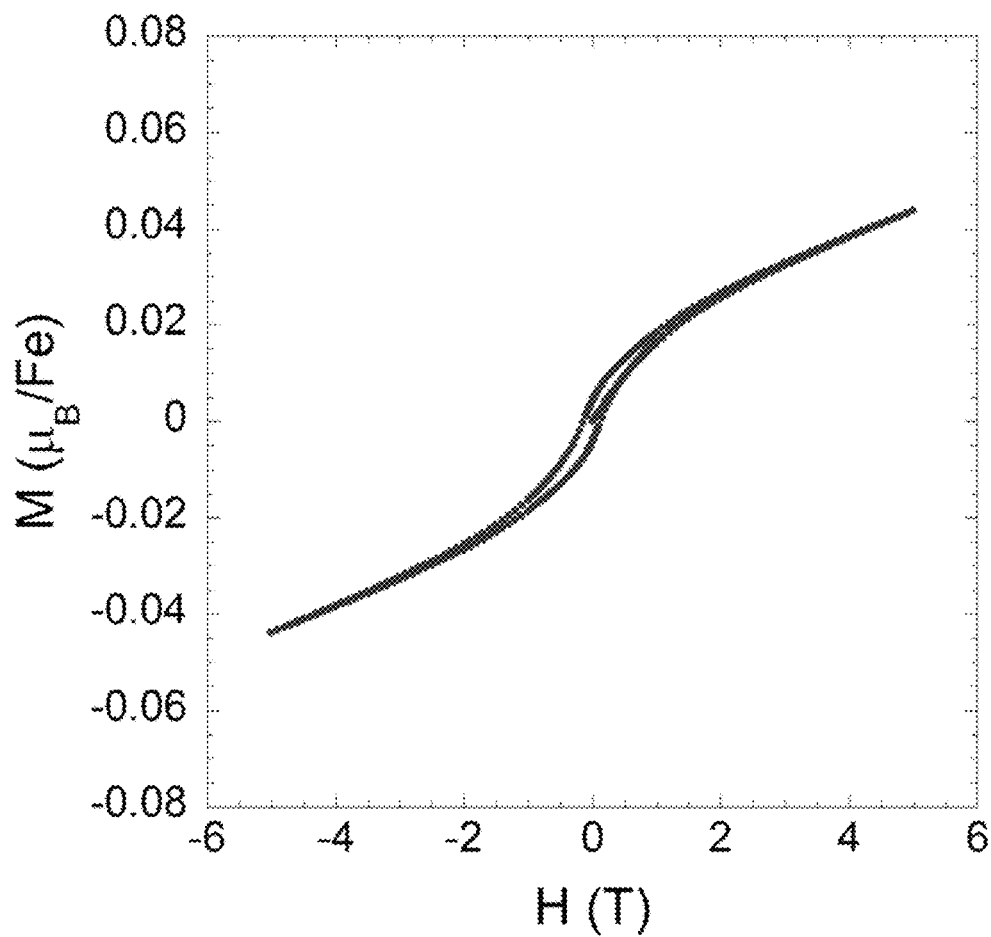
FIG. 16b presents M vs. H plot for Na$_{-2.2}$Ba$_8$Fe$_{12}$O$_{24}$(O/OH)$_6$. Data collected at 2K.

Based on the refined composition of $Na_{2.84}Ba_8Fe_{12}O_{24}(O/OH)_6 \cdot 6.3(H_2O)$, it was concluded that the average oxidation state of iron was very close to 3.0 (2.93), which indicated that the framework was built from Fe(III)-based $FeO_4$ tetrahedra. Tetrahedral high-spin ferric ions have a $d^5$ electron configuration, making this framework very rich in unpaired electrons. To investigate the magnetic behavior of $Na_{2.84}Ba_8Fe_{12}O_{24}(O/OH)_6\cdot 6.3(H_2O)$ both zero field cooled (zfc) and field cooled (fc) magnetic susceptibility data were collected. FIG. 16a shows the temperature dependence of the magnetic data and reveals that the zfc and fc traces do not overlay. Interestingly, even at temperatures as high as 700K the observed behavior clearly deviates from the Curie-Weiss law. As the material is not thermally stable at higher temperatures, it was not possible to pursue magnetic measurements at temperatures higher than 700 K. FIG. 16b shows the field dependence measured at 2K. The non-linearity is consistent with the fc and zfc data.

Figure 17:
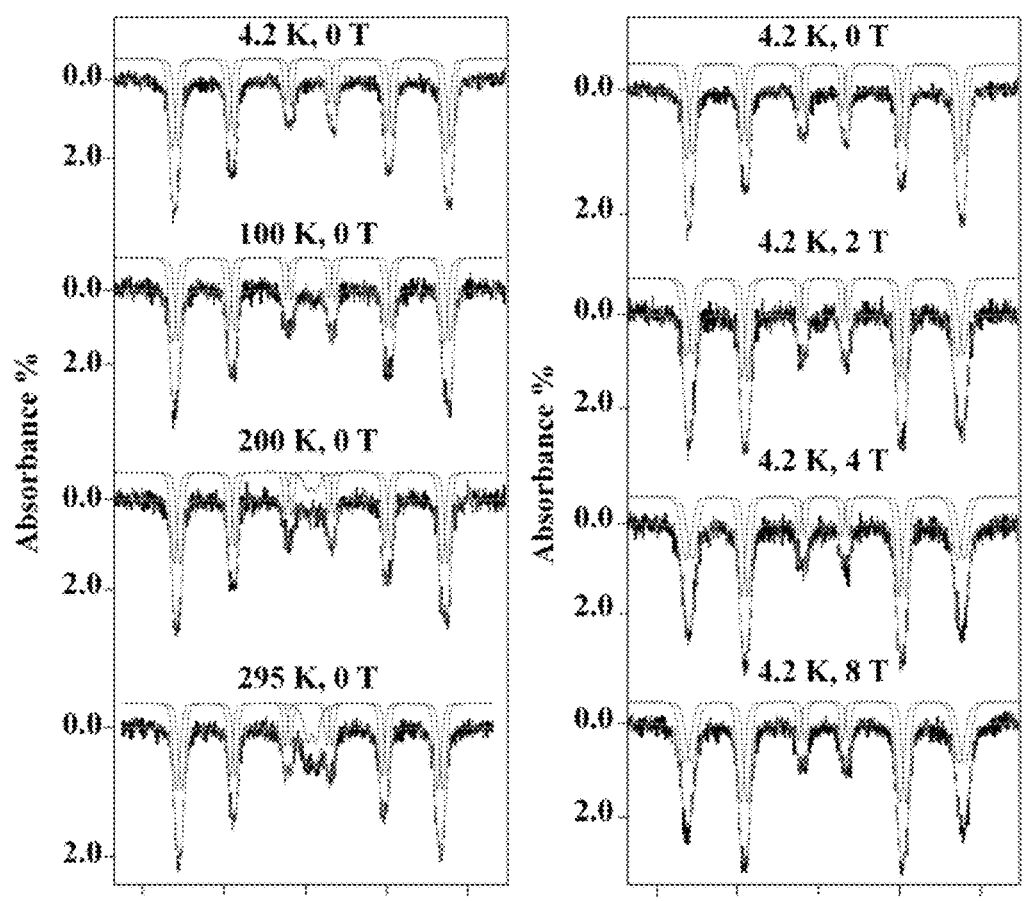
FIG. 17 presents in the left panel variable-temperature, zero-field spectra recorded for the Na-containing zeolite sample. The right panel presents variable-field $^{57}$Fe Mössbauer spectra recorded at 4.2 K. The solid gray traces overlaid over the experimental spectra are simulations obtained from the sum of two/three components that are drawn above the spectra.

The large iron content of the material provided the opportunity to further interrogate the electronic structure of iron sites by performing $^{57}$Fe Mössbauer spectroscopic measurements. FIG. 17 shows a series of temperature- and field-dependent spectra recorded for a ground powder sample of the material. The zero-field spectra feature a six-line pattern, which demonstrated the presence of a spontaneous magnetic field that acts on the $^{57}$Fe nuclei. In turn, this observation revealed the presence of a magnetically ordered ground state. Interestingly, ordering was preserved even at room temperature. However, as the temperatures increased above 100 K an additional two-line component that is, a quadrupole doublet was observed. This finding suggested that some particles present in the powder sample were nanosized and that they exhibited a typical superparamagnetic behavior. The solid gray traces overlaid over the experimental data were spectral simulations obtained from the sum of two components for the field-dependent 4.2 K spectra and respectively, three components for the zero-field, temperature-dependent spectra. The individual components were drawn separately above the experimental spectra.

The two sextets have equal intensities and were essentially identical but differ from one another by the sign of the component of the electric-field gradient (EFG) tensor that was found along the spontaneous field, ε. Moreover, all three subspectra were characterized by isomer shifts, δ=0.28-0.35 mm/s, that are typical of high-spin ferric ions supported by an all-oxygen tetra-coordinate environment. The magnitude of the internal field associated with the observed magnetic hyperfine splitting of the two sextets, $B_{int}$=~52(1) T, was also typical of S=5/2 Fe(III) ions and essentially identical to that observed for the iron(III) sites of binary iron oxides. The observation of two spectral components that exhibit magnetic hyperfine splitting and have equal areas is typically indicative of an antiferromagnetic ordered state. In order to assess the nature of the exchange interactions of the two magnetic sublattices a series of field-dependent measurements were performed. In zero-field, the two sextets exhibited an approximate 3:2:1:1:2:3 pattern which demonstrated that the hyperfine fields were randomly distributed with respect to the propagation direction of the 14.41 keV γ-ray used to detect the Mössbauer effect. In the measurements the magnetic field was applied parallel to propagation direction of the γ ray. For a collinear antiferromagnet it is expected that the internal field will align parallel applied field. Consequently, for the setup used, it was expected that the applied field would induce a decrease in the intensities of the middle, $\Delta m_I$=0 lines. In contrast, as shown in the right panel on FIG. 17, a field-induced increase in the intensities of $\Delta m_I$=0 lines was seen. This demonstrated an orthogonal alignment of the internal field with respect field which in turn establishes that the moments associated with the two individual magnetic sublattices are canted that is, a non-collinear antiferromagnetic ordered state.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole and in part. Furthermore, those of ordinary skill in the art will appreciate that the foregoing description is by way of example only, and is not intended to limit the invention so further described in the appended claims.

What is claimed:

1. An iron-based crystal structure having the formula:

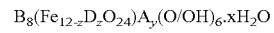

$B_8(Fe_{12-z}D_zO_{24})A_y(O/OH)_6\cdot xH_2O$

In which:
A is Na, K, Cs, or a combination thereof;
1≤y≤6;
B comprises Be, Mg, Ca, Sr, Ba, or a combination thereof;
0≤x≤25;
D is an element that can take on tetrahedral coordination; and
0≤z≤about 6.

2. The iron-based crystal structure of claim 1, wherein D is a main group element selected from Si, Ge, Al, Ga, P, As, and Zn.

3. The iron-based crystal structure of claim 1, wherein D is a transition metal element or a mixture thereof.

4. The iron-based crystal structure of claim 3, wherein D comprises V, Cr, Mn, Co, Ni, or Cu.

5. The iron-based crystal structure of claim 1, wherein y is 1.

6. The iron-based crystal structure of claim 1, wherein B is Ba or Sr.

7. The iron-based crystal structure of claim 1, wherein A comprises Na, K, or a combination of Na and K.

8. The iron-based crystal structure of claim 7, wherein A is a combination of Na and K, with Na having an atomic percent of A that is about 90% to about 99.5%.

9. The iron-based crystal structure of claim 1, wherein A is a combination of Na and K, with Na having an atomic percent of A that is about 95% to about 99.5%.

10. The iron-based crystal structure of claim 1, wherein 1≤x≤10.

11. The iron-based crystal structure of claim 1, wherein A comprises Cs.

12. The iron-based crystal structure of claim 1 having the formula $B_8(Fe_{12}O_{24})A_y(O/OH)_6\cdot xH_2O$.

13. An iron-based crystal structure having the formula:

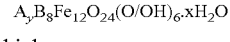

$A_yB_8Fe_{12}O_{24}(O/OH)_6\cdot xH_2O$

In which
A is Na, K, Cs, or a combination thereof;
1≤y≤6;
B comprises Be, Mg, Ca, Sr, Ba, or a combination thereof; and
0≤x≤25.

14. The iron-based crystal structure of claim 13, wherein y is 1.

15. The iron-based crystal structure of claim 13, wherein B is Ba or Sr.

16. The iron-based crystal structure of claim 13, wherein A comprises Na, K, or a combination of Na and K.

17. The iron-based crystal structure of claim 16, wherein A is a combination of Na and K, with Na having an atomic percent of A that is about 90% to about 99.5%.

18. The iron-based crystal structure of claim 13, wherein A comprises Cs.

19. The iron-based crystal structure of 13, wherein $1 \leq x \leq 10$.

20. The iron-based crystal structure of claim 13, having the formula $Na_{2.84}Ba_8Fe_{12}O_{24}(O/OH)_6(H_2O)_{6.3}$.

* * * * *